(12) United States Patent
Li et al.

(10) Patent No.: US 10,264,595 B2
(45) Date of Patent: Apr. 16, 2019

(54) TRAFFIC-PRIORITY BASED SILENCING TECHNIQUES FOR INTERFERENCE MITIGATION

(71) Applicant: QUALCOMM Incorporated, San Diego, CA (US)

(72) Inventors: Chong Li, Weehawken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/386,653

(22) Filed: Dec. 21, 2016

(65) Prior Publication Data

US 2018/0176935 A1 Jun. 21, 2018

(51) Int. Cl.
*H04W 72/12* (2009.01)
*H04W 48/16* (2009.01)
(Continued)

(52) U.S. Cl.
CPC ....... *H04W 72/1242* (2013.01); *H04W 48/16* (2013.01); *H04W 72/1289* (2013.01);
(Continued)

(58) Field of Classification Search
CPC . H04W 72/1242; H04W 48/16; H04W 88/04; H04W 72/1289; H04W 76/023;
(Continued)

(56) References Cited

U.S. PATENT DOCUMENTS 8,654,726 B2 2/2014 Park et al.
8,700,085 B2 4/2014 Johnsson et al.
(Continued)

FOREIGN PATENT DOCUMENTS

EP 3294022 A1 3/2018
WO WO-2014031829 A2 2/2014
(Continued)

OTHER PUBLICATIONS

Shariatmadari H., et al., "Analysis of Transmission Modes for Ultra-Reliable Communications", IEEE PIMRC, Department of Communications and Networking, Aalto University, Sep. 2016, pp. 1-6.

(Continued)

*Primary Examiner* — Faisal Choudhury
(74) *Attorney, Agent, or Firm* — Holland & Hart LLP/Qualcomm

(57) ABSTRACT

Techniques are described herein to provide priority traffic grant-less access to pre-defined communication resources that are semi-persistently scheduled. A set of semi-persistent communication resources may be reserved for use by priority traffic. If not used for priority traffic, the semi-persistent resources may be scheduled for use by other types of traffic. As priority traffic is identified, the priority traffic may be transmitted using the semi-persistent resource without having those communication resources granted by a scheduling entity. Such grant-less access to the semi-persistent resources may result in interference between the scheduled traffic and the priority traffic communicated without first scheduling the specific communication resources. To mitigate interference between different traffic types, a user equipment (UE) may transmit a device-to-device silencing message to other UEs. Upon receiving the silencing message, the other UEs may release any scheduled communication resources that at least partially overlap with the semi-persistent resources.

24 Claims, 25 Drawing Sheets

(51) Int. Cl.
*H04W 76/14* (2018.01)
*H04W 88/04* (2009.01)
*H04W 72/02* (2009.01)
*H04W 72/10* (2009.01)

(52) U.S. Cl.
CPC ............ *H04W 76/14* (2018.02); *H04W 72/02* (2013.01); *H04W 72/10* (2013.01); *H04W 72/1278* (2013.01); *H04W 88/04* (2013.01)

(58) Field of Classification Search
CPC . H04W 72/02; H04W 72/10; H04W 72/1278; H04W 76/14
USPC .......................................................... 370/336
See application file for complete search history.

(56) References Cited

U.S. PATENT DOCUMENTS

| | | | |
|---|---|---|---|
| 8,885,507 B2 | 11/2014 | Chen et al. | |
| 2015/0055460 A1* | 2/2015 | Sunnell | H04W 76/38 370/230 |
| 2016/0044619 A1 | 2/2016 | Ryu et al. | |
| 2017/0019881 A1* | 1/2017 | Cao | H04W 76/14 |
| 2017/0064736 A1* | 3/2017 | Yu | H04W 76/14 |
| 2017/0325214 A1* | 11/2017 | Lu | H04W 76/14 |
| 2018/0199351 A1* | 7/2018 | Ro | H04W 72/10 |

FOREIGN PATENT DOCUMENTS

| | | |
|---|---|---|
| WO | WO-2016116166 A1 | 7/2016 |
| WO | WO-2016176965 A1 | 11/2016 |

OTHER PUBLICATIONS

Huawei et al., "Discussions on Remaining Issues for SPS", 3GPP Draft; R2-167930 Discussions on Remaining Issues for SPS, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 14, 2016-Nov. 18, 2016 Nov. 13, 2016 (Nov. 13, 2016), XP051177665, Retrieved from the Internet: URL:http://www.3gpp.org/ftp/Meetings_3GPP_SYNC/RAN2/Docs/ [retrieved on Nov. 13, 2016], 6 pages.

Interdigital Communications; "Priority Handling for D2D communications", 3GPP DRAFT; R1-153374 IDCC ED2D Priority, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015 May 24, 2015 (May 24, 2015), XP050971753, Retrieved from the Internet: URL:http://www.3gpp.org/ftp/Meetings_3GPP_SYNC/RAN1/Docs/ [retrieved on May 24, 2015], 6 pages.

NTT DOCOMO: "On URLLC Scheduling and HARQ Mechanism", 3GPP DRAFT; R1-1612713 NR_URLLC_FINAL, 3rd Generation Partnership Project (3GPP), Mobile Competence Centre; 650, Route Des Lucioles; F-06921 Sophia-Antipolis Cedex; France, vol. RAN WG1, No. Reno. USA; Nov. 14, 2016-Nov. 18, 2016 Nov. 13, 2016 (Nov. 13, 2016), XP051176656, Retrieved from the Internet: URL:http://www.3gpp.org/ftp/Meetings_3GPP_SYNC/RAN1/Docs/ [retrieved on Nov. 13, 2016], 8 pages.

Partial International Search Report—PCT/US2017/063290—ISA/EPO—dated Mar. 2, 2018 (164245WO).

International Search Report and Written Opinion—PCT/US2017/063290—ISA/EPO—dated Jun. 14, 2018 (164245WO).

\* cited by examiner

TRAFFIC-PRIORITY BASED SILENCING TECHNIQUES FOR INTERFERENCE MITIGATION

BACKGROUND

The following relates generally to wireless communication, and more specifically to traffic-priority-based silencing techniques for interference mitigation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Multiple types of traffic may be communicated in a wireless communication system. In some cases, different performance metrics of the different types of traffic may cause some types of traffic to have a higher priority than others. One example of a type of traffic in a wireless communication system may include ultra-reliability low-latency communications (URLLC), also sometimes referred to as mission-critical communications, which may specify that packets are communicated with low latency and with high-reliability. URLLC or mission-critical communications may be examples of communications having a high priority, or a priority that is above a threshold. Low priority communications include communications that have a priority that is below a threshold. Examples of communications having a priority level that is less than that of URLLC or mission-critical communications include enhanced mobile broadband (eMBB) communications. A wireless communication system may designate resources to be used for various types of communications, such as high priority or low priority traffic.

SUMMARY

The described techniques relate to improved methods, systems, devices, or apparatuses that support traffic-priority-based silencing techniques for interference mitigation. Generally, the described techniques provide priority traffic grantless access to pre-defined communication resources that are semi-persistently scheduled. A set of semi-persistent communication resources may be reserved for use by priority traffic. If the semi-persistent resources are not used for priority traffic, the semi-persistent resources may be scheduled for use by other types of traffic. As priority traffic is identified, the priority traffic may be transmitted using the semi-persistent resource without having those communication resources granted by a scheduling entity. Such grantless access to the semi-persistent resources may result in interference between the scheduled traffic and the priority traffic communicated without first scheduling the specific communication resources. To mitigate interference between different traffic types, a UE may transmit a device-to-device silencing message to other UEs. Upon receiving the silencing message, the other UEs may release any scheduled communication resources that at least partially overlap with the semi-persistent resources.

A method of wireless communication is described. The method may include receiving, by a first user equipment (UE), a grant of communication resources, receiving a silencing message from a second UE, the silencing message indicating that the second UE is to communicate priority traffic using semi-persistent resources, wherein the semi-persistent resources at least partially overlap with the communication resources, and releasing at least a portion of the communication resources based at least in part on the silencing message.

An apparatus for wireless communication is described. The apparatus may include means for receiving, by a first user equipment (UE), a grant of communication resources, means for receiving a silencing message from a second UE, the silencing message indicating that the second UE is to communicate priority traffic using semi-persistent resources, wherein the semi-persistent resources at least partially overlap with the communication resources, and means for releasing at least a portion of the communication resources based at least in part on the silencing message.

Another apparatus for wireless communication is described. The apparatus may include a processor, memory in electronic communication with the processor, and instructions stored in the memory. The instructions may be operable to cause the processor to receive, by a first user equipment (UE), a grant of communication resources, receive a silencing message from a second UE, the silencing message indicating that the second UE is to communicate priority traffic using semi-persistent resources, wherein the semi-persistent resources at least partially overlap with the communication resources, and release at least a portion of the communication resources based at least in part on the silencing message.

A non-transitory computer readable medium for wireless communication is described. The non-transitory computer-readable medium may include instructions operable to cause a processor to receive, by a first user equipment (UE), a grant of communication resources, receive a silencing message from a second UE, the silencing message indicating that the second UE is to communicate priority traffic using semi-persistent resources, wherein the semi-persistent resources at least partially overlap with the communication resources, and release at least a portion of the communication resources based at least in part on the silencing message.

Some examples of the method, apparatus, and non-transitory computer-readable medium described above may further include processes, features, means, or instructions for determining a next occurrence of the semi-persistent resources after receiving the silencing message, wherein the portion of the communication resources that may be released at least partially overlap with the next occurrence of the semi-persistent resources.

In some examples of the method, apparatus, and non-transitory computer-readable medium described above, the silencing message may be received during the same transmission time interval that the portion of the communication resources may be released.

Some examples of the method, apparatus, and non-transitory computer-readable medium described above may further include processes, features, means, or instructions for receiving a discovery message indicating that the second UE may be capable of generating priority traffic. Some examples of the method, apparatus, and non-transitory computer-readable medium described above may further include processes, features, means, or instructions for transmitting a reporting message to a base station indicating that the second UE may have received the discovery message from the first UE.

In some examples of the method, apparatus, and non-transitory computer-readable medium described above, the discovery message may be a device-to-device communication received directly from the second UE.

Some examples of the method, apparatus, and non-transitory computer-readable medium described above may further include processes, features, means, or instructions for receiving, from a base station, a configuration message indicating a zone assigned to the first UE and that the semi-persistent resources may be associated with the zone.

In some examples of the method, apparatus, and non-transitory computer-readable medium described above, the zone may be based at least in part on the second UE being capable of generating priority traffic.

Some examples of the method, apparatus, and non-transitory computer-readable medium described above may further include processes, features, means, or instructions for comparing the communication resources allocated to the first UE by the grant to the semi-persistent resources associated with the second UE, wherein releasing the communication resources may be based at least in part on the comparing.

Some examples of the method, apparatus, and non-transitory computer-readable medium described above may further include processes, features, means, or instructions for determining that the communication resources may be being used to communicate traffic having a lesser priority than the priority traffic, wherein releasing the communication resources may be based at least in part on the determining.

Some examples of the method, apparatus, and non-transitory computer-readable medium described above may further include processes, features, means, or instructions for refraining, by the first UE, from transmitting traffic during the communication resources based at least in part on releasing the communication resources.

Some examples of the method, apparatus, and non-transitory computer-readable medium described above may further include processes, features, means, or instructions for receiving, by the first UE, a second grant that includes new communication resources rescheduling the traffic for transmission, wherein the new communication resources may be different from the communication resources.

In some examples of the method, apparatus, and non-transitory computer-readable medium described above, the second UE may be capable of generating priority traffic.

In some examples of the method, apparatus, and non-transitory computer-readable medium described above, the priority traffic may be low latency traffic.

A method of wireless communication is described. The method may include identifying, by a first user equipment (UE), priority traffic to transmit to a base station, transmitting, by the first UE, a silencing message to a second UE based at least in part on the identifying, the silencing message indicating to the second UE that the first UE is to communicate the priority traffic using semi-persistent resources, wherein the semi-persistent resources at least partially overlap with communication resources granted to the second UE, and transmitting, by the first UE and to the base station, the priority traffic using the semi-persistent resources.

An apparatus for wireless communication is described. The apparatus may include means for identifying, by a first user equipment (UE), priority traffic to transmit to a base station, means for transmitting, by the first UE, a silencing message to a second UE based at least in part on the identifying, the silencing message indicating to the second UE that the first UE is to communicate the priority traffic using semi-persistent resources, wherein the semi-persistent resources at least partially overlap with communication resources granted to the second UE, and means for transmitting, by the first UE and to the base station, the priority traffic using the semi-persistent resources.

Another apparatus for wireless communication is described. The apparatus may include a processor, memory in electronic communication with the processor, and instructions stored in the memory. The instructions may be operable to cause the processor to identify, by a first user equipment (UE), priority traffic to transmit to a base station, transmit, by the first UE, a silencing message to a second UE based at least in part on the identifying, the silencing message indicating to the second UE that the first UE is to communicate the priority traffic using semi-persistent resources, wherein the semi-persistent resources at least partially overlap with communication resources granted to the second UE, and transmit, by the first UE and to the base station, the priority traffic using the semi-persistent resources.

A non-transitory computer readable medium for wireless communication is described. The non-transitory computer-readable medium may include instructions operable to cause a processor to identify, by a first user equipment (UE), priority traffic to transmit to a base station, transmit, by the first UE, a silencing message to a second UE based at least in part on the identifying, the silencing message indicating to the second UE that the first UE is to communicate the priority traffic using semi-persistent resources, wherein the semi-persistent resources at least partially overlap with communication resources granted to the second UE, and transmit, by the first UE and to the base station, the priority traffic using the semi-persistent resources.

Some examples of the method, apparatus, and non-transitory computer-readable medium described above may further include processes, features, means, or instructions for broadcasting a discovery message to the second UE indicating that the first UE may be capable of generating priority traffic.

In some examples of the method, apparatus, and non-transitory computer-readable medium described above, the discovery message may be a device-to-device communication transmitted directly to the second UE.

Some examples of the method, apparatus, and non-transitory computer-readable medium described above may further include processes, features, means, or instructions for receiving, from the base station, a configuration message indicating that the semi-persistent resources may be reserved for use by the priority traffic.

In some examples of the method, apparatus, and non-transitory computer-readable medium described above, the priority traffic may be transmitted during the first semi-persistent resources available after the silencing message may be transmitted.

In some examples of the method, apparatus, and non-transitory computer-readable medium described above, the silencing message may be a device-to-device communication transmitted directly to the second UE.

A method of wireless communication is described. The method may include receiving, by a base station, a reporting message from a first user equipment (UE) indicating that the first UE is capable of receiving messages transmitted by a second UE and that the second UE is capable of generating priority traffic, assigning semi-persistent resources to be used by the second UE to transmit the priority traffic, and transmitting a configuration message to the second UE indicating the assigned semi-persistent resources.

An apparatus for wireless communication is described. The apparatus may include means for receiving, by a base station, a reporting message from a first user equipment (UE) indicating that the first UE is capable of receiving messages transmitted by a second UE and that the second UE is capable of generating priority traffic, means for assigning semi-persistent resources to be used by the second UE to transmit the priority traffic, and means for transmitting a configuration message to the second UE indicating the assigned semi-persistent resources.

Another apparatus for wireless communication is described. The apparatus may include a processor, memory in electronic communication with the processor, and instructions stored in the memory. The instructions may be operable to cause the processor to receive, by a base station, a reporting message from a first user equipment (UE) indicating that the first UE is capable of receiving messages transmitted by a second UE and that the second UE is capable of generating priority traffic, assign semi-persistent resources to be used by the second UE to transmit the priority traffic, and transmit a configuration message to the second UE indicating the assigned semi-persistent resources.

A non-transitory computer readable medium for wireless communication is described. The non-transitory computer-readable medium may include instructions operable to cause a processor to receive, by a base station, a reporting message from a first user equipment (UE) indicating that the first UE is capable of receiving messages transmitted by a second UE and that the second UE is capable of generating priority traffic, assign semi-persistent resources to be used by the second UE to transmit the priority traffic, and transmit a configuration message to the second UE indicating the assigned semi-persistent resources.

Some examples of the method, apparatus, and non-transitory computer-readable medium described above may further include processes, features, means, or instructions for generating a zone based at least in part on receiving the reporting message, the semi-persistent resources being associated with the zone, wherein the configuration message indicates the zone.

Some examples of the method, apparatus, and non-transitory computer-readable medium described above may further include processes, features, means, or instructions for receiving a second reporting message indicating that a third UE different from the second UE may be capable of generating priority traffic, wherein the zone and the semi-persistent resources may be based at least in part on the reporting message and the second reporting message.

Some examples of the method, apparatus, and non-transitory computer-readable medium described above may further include processes, features, means, or instructions for granting an assignment of communication resources to traffic generated by the first UE, the communication resources at least partially overlapping with the semi-persistent resources, wherein the traffic may have a lower priority than the priority traffic. Some examples of the method, apparatus, and non-transitory computer-readable medium described above may further include processes, features, means, or instructions for receiving, from the second UE, the priority traffic using at least a portion of the communication resources granted to the traffic.

Some examples of the method, apparatus, and non-transitory computer-readable medium described above may further include processes, features, means, or instructions for determining that traffic scheduled to be received using communication resources that at least partially overlap with the semi-persistent resources was not received. Some examples of the method, apparatus, and non-transitory computer-readable medium described above may further include processes, features, means, or instructions for transmitting a scheduling message to the first UE rescheduling the traffic based at least in part on the determining.

DETAILED DESCRIPTION

Figure 1:
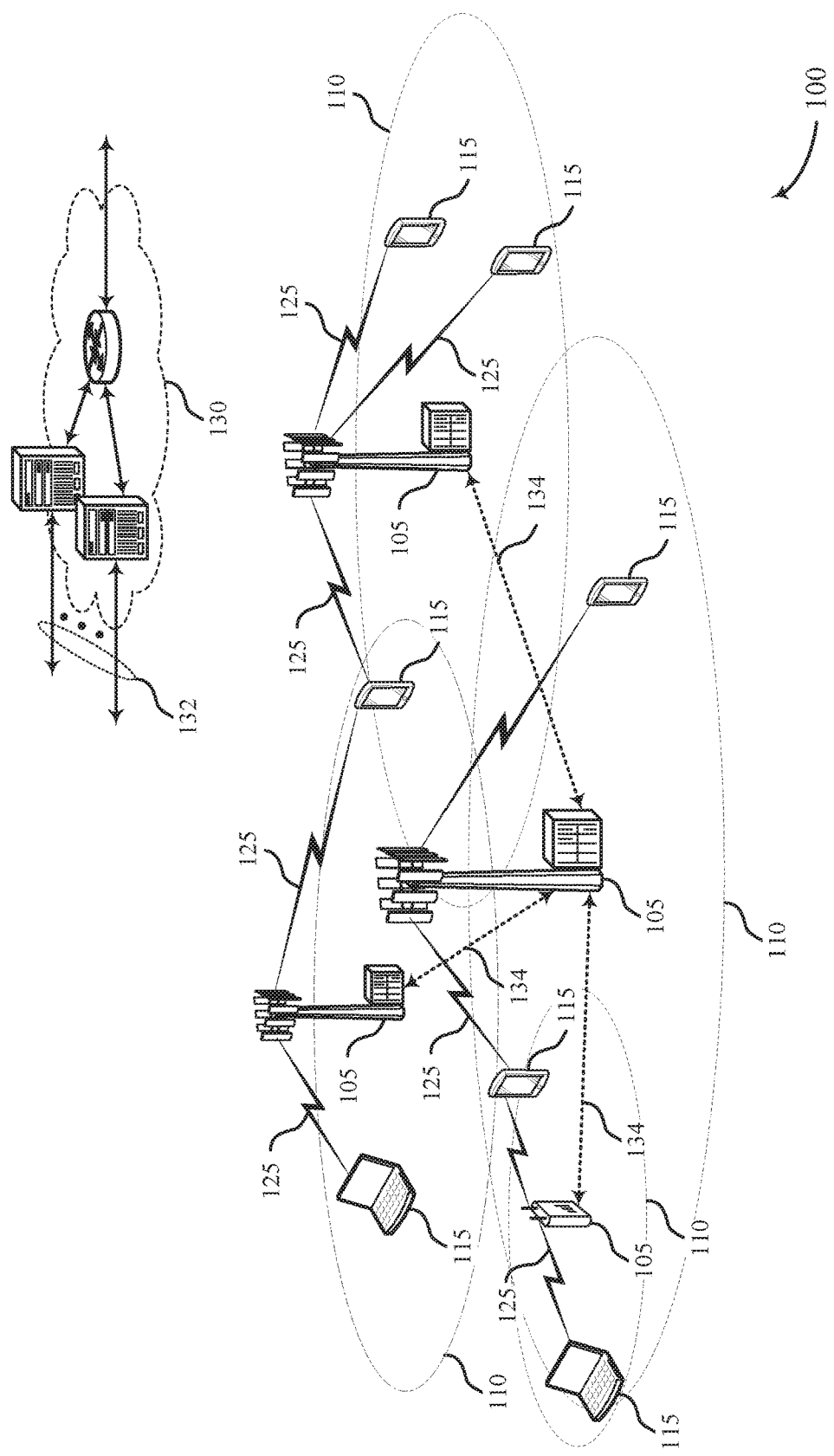
FIG. 1 illustrates an example of a system for wireless communication that supports traffic-priority-based silencing techniques for interference mitigation in accordance with aspects of the present disclosure.

Wireless communication systems may communicate multiple types of traffic having different performance metrics or performance requirements. The different performance metrics of the different types of traffic may have competing aims that do not always work well together. For example, some types of applications may use the wireless communication system for high-throughput applications where large amounts of data are communicated (e.g., downloading a large file). Other types of applications may use the wireless communication system for low-latency applications where the delivery speed of individual packets is a prime consideration (e.g., self-driving vehicles). Such different considerations and performance metrics may, at times, place conflicting demands for use on a wireless communication system.

Techniques are described herein to provide priority traffic grant-less access to pre-defined communication resources that are semi-persistently scheduled. A set of semi-persistent communication resources may be reserved for use by priority traffic. If the semi-persistent resources are not used for priority traffic, the semi-persistent resources may be scheduled for use by other types of traffic. As priority traffic is identified, the priority traffic may be transmitted using the next available semi-persistent resource without having those communication resources granted by a scheduling entity. Such grant-less access to the semi-persistent resources may result in interference between the scheduled traffic and the priority traffic communicated without first scheduling the specific communication resources. To mitigate interference between different traffic types, a UE may transmit a device-to-device silencing message to other UEs. Upon receiving the silencing message, the other UEs may release any scheduled communication resources that at least partially overlap with the semi-persistent resources.

By providing priority traffic grant-less access to semi-persistent resources, the priority traffic (e.g., low-latency traffic) may be able to arrive within a time-frame specified by its performance metrics. In addition, use of a device-to-device silencing message allows other types of traffic to use the semi-persistent resources without unduly comprising the priority traffic's ability to arrive at its destination within its performance metrics. In some examples, a discovery procedure may be performed prior to using silencing messages.

Aspects of the disclosure are initially described in the context of a wireless communications system. Aspects of the disclosure are illustrated by and described with reference to the wireless communication systems, the resources structures, and the process flows that relate to traffic-priority based silencing techniques for interference mitigation. Aspects of the disclosure are further illustrated by and described with reference to apparatus diagrams, system diagrams, and flowcharts that relate to traffic-priority-based silencing techniques for interference mitigation.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Because these different types of communications have different performance requirements or different performance metrics, in some situations, some of these communications may have priority over other communications. To reduce interference between data and to prevent collisions of data, a UE that transmits priority traffic may first transmit a device-to-device silencing message to other UEs. Upon receiving the silencing message, the other UEs may release any scheduled communication resources that at least partially overlap with the semi-persistent resources.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. A UE 115 may transmit a silencing message in a D2D manner to other UEs to clear semi-persistent resources for us by high-priority traffic.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some examples, the mission-critical UEs that transmit silencing messages may be MTC devices.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

Wireless communications system 100 may operate in an ultra high frequency (UHF) frequency region using frequency bands from 700 MHz to 2600 MHz (2.6 GHz), although in some cases wireless local area networks (WLAN) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference. The silencing messages may also be used when using narrow beams to communicate data.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten one millisecond subframes numbered from zero to nine. A subframe may be further divided into two 0.5 millisecond slots, each of which contains six or seven modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, seven consecutive OFDM symbols in the time domain (one slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Figure 2:
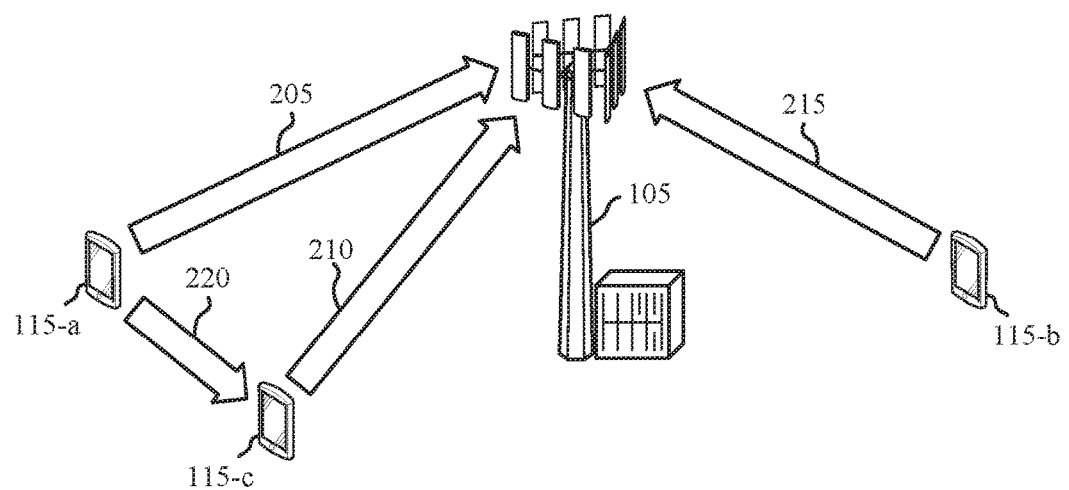
FIG. 2 illustrates an example of a wireless communication system that supports traffic-priority-based silencing techniques for interference mitigation in accordance with aspects of the present disclosure.

FIG. 2 illustrates an example of a wireless communication system 200 for traffic-priority-based silencing techniques for interference mitigation. The wireless communication system 200 may support device-to-device (D2D) silencing messages 220 configured to mitigate interference between high-priority traffic and low-priority traffic. The wireless communication system may include a base station 105, a transmitting UE 115-a, a UE 115-b, and a receiving UE 115-c. The transmitting UE 115-a may be a UE that transmits a D2D silencing message 220 and the receiving UE 115-c may be a UE that receives the D2D silencing message 220. In the some examples, the transmitting UE 115-a may be mission-critical UE capable of generating high-priority traffic and the UEs 115-b, 115-c may be associated with low-priority traffic. The UEs 115-a, 115-b, 115-c may send data transmissions 205, 210, 215 to the base station 105 using communication resources that comprise frequency resources and time-based resources. In some scenarios, interference between data transmission may be caused at least in part by multiple types of traffic being communicated using the same communication resources. As used herein, the term "transmitting UE" may refer to a UE that transmits high-priority traffic in a wireless communication system. The term "receiving UE" may refer to any other UE in the wireless communication system and in particular refers to any UE that receives a D2D message from the transmitting UE. In some instances, a receiving UE may be capable of generating high-priority traffic.

Multiple types of traffic may be communicated in the wireless communication system 200. Different types of traffic may have different performance metrics or requirements. In some cases, the different performance metrics may cause some types of traffic to have a higher priority than others. For example, ultra-reliability low-latency communications (URLLC) may require that packets are communicated with low latency (e.g., within 500 microseconds of detection) and with high-reliability. As such, URLLC traffic may have priority over other types of traffic in the wireless communication system 200. Other types of network traffic may include mobile broadband traffic, enhanced mobile broadband (eMBB) traffic, or machine-to-machine traffic. High-priority traffic (e.g., URLLC traffic) may include network traffic related to a smart electrical grid, industrial automation, augmented reality applications, or may be used in automotive and aviation applications (e.g., self-driving vehicles). Some resource allocation procedures used in a wireless communication system may be unable to satisfy the low-latency and high reliability performance metrics of high-priority traffic.

To satisfy some performance metrics, high-priority traffic may be given grant-less access to certain resources that are semi-persistently scheduled. Grant-less access may refer to a situation where a UE 115 may use the communication resources without requesting resources from the base station 105 or receiving a resource grant from the base station 105. For example, in some cases, rather than requesting resources the UE 115-a may transmit high-priority traffic (e.g., data transmission 205) using the next-available semi-persistent resources. Furthermore, when not being used by high-priority traffic, a base station 105 may schedule the resources to be used by low-priority traffic (e.g., data transmissions 210 or 215). Grant-less communication, however, may result in collisions between low-priority traffic scheduled to use the semi-persistent resources (e.g., data transmission 210) and the high-priority traffic communicated without first scheduling specific resources (e.g., data transmission 205). If such collisions occur, the high-priority traffic may not arrive at or may not be successfully received by the base station 105. If the high-priority traffic is not received by the base station 105, the communication may also fail to satisfy the reliability performance metrics of high-priority traffic.

To mitigate interference, the low-priority traffic that is scheduled to use communication resources that at least partially overlap with semi-persistent resources (e.g., data transmission 210) may be silenced based on a D2D silencing message transmitted by the transmitting UE 115-a. Upon receiving the silencing message 220, the transmitting UE 115-c may refrain from transmitting its scheduled traffic using the communication resources that at least partially overlap with the semi-persistent resources. As such, the high-priority traffic may therefore be successfully received by the base station 105 while the scheduled low-priority traffic is not received by the base station. When granting low-priority traffic access to semi-persistent resources, a base station 105 may indicate to the receiving UE 115-c which resources in the grant are semi-persistent resources.

In some instances, the transmitting UE 115-a (capable of generating high-priority traffic) may silence other UEs (e.g., receiving UE 115-c) transmitting low-priority traffic using communication resources that overlap with the semi-persistent resources. The transmitting UE 115-a then may use the released resources for its own high-priority traffic. When the transmitting UE 115-a wants to send high-priority traffic, instead of sending a scheduling request to the base station 105, the transmitting UE 115-a may transmit a silencing message 220 to other UEs 115. The silencing message 220 may be a device-to-device communication and may not include any involvement from the base station 105. Upon receiving the silencing message 220, the other UEs 115 may refrain from transmitting low-priority packets using communication resources that at least in partially overlap with semi-persistent resources. The transmitting UE 115-a may transmit its high-priority traffic using the released uplink resources.

To coordinate which communication resources are released and to mitigate which UEs release communication resources, a discovery procedure may be performed. In the discovery procedure, the transmitting UE 115-a may periodically broadcast a discovery message to other UEs in a device-to-device manner. Other UEs may detect the discovery message and report to the base station 105 what discovery messages were detected. Based on the reporting messages, the base station 105 may generate one or more zones of protection in its coverage area. The base station 105 may also determine a resource pool of semi-persistent resources for each zone of protection. The base station 105 may inform the UEs 115 which zone of protection they are in. When the transmitting UE 115-a identifies high-priority data to be transmitted, the transmitting UE 115-a may identify which resources to transmit the high-priority data based on the zones and the resource pools. In addition, other UEs that receive a silencing message from the transmitting UE 115-a, may release resources based on what zone of protection they are in. In this manner, the other UEs 115 may need not release all of their scheduled resources after receiving a silencing message. The transmitting UE 115-a may transmit the high-priority traffic using the semi-persistent resources associated with the zone of protection. In some examples, the silencing message is transmitted using a physical downlink control channel (PDCCH).

As used herein, the term "traffic" may refer to any information moving being communicated between entities in a communication system. For example, traffic may refer to data, packets, communications, messages, indications, signals, or other types of data that may be communicated via a communication system.

As used herein, the term "high-priority traffic" may refer to data that is able to take precedence over other types of traffic. The term "low-priority traffic" may refer to the other types of traffic that are not able to take precedence. To illustrate the use of the term priority, in some wireless communication systems, all traffic may be treated equally. For example, traffic may be transmitted based on the order that the traffic requested transmission. During heavy traffic periods, however, there may be a delay between a request to transmit data and actual transmission of the data. In some examples, high priority traffic may refer to traffic that is capable of being transmitted before other types of traffic that may have requested the resources first. In some examples, high-priority traffic may be identified based on performance metrics associated with the high-priority traffic. In some instances, the high-priority traffic is low-latency traffic that includes a performance metric indicating that the traffic should be received by its intended recipient within a certain period of time. In some examples, high-priority traffic may be referred to simply as priority traffic of and the low-priority traffic may be referred to as traffic, where the priority traffic has a higher priority than the traffic.

The wireless communication system 200 may be an example of the wireless communications system 100 described with reference to FIG. 1. While only a single base station 105 and three UEs 115 are depicted, the wireless communication system 200 may include any number of base station 105 and/or UEs 115, among other components. The base station 105 may be an example of the base stations 105 described with reference to FIG. 1. The UEs 115-*a*, 115-*b*, 115-*c* be examples of the UEs 115 described with reference to FIG. 1.

Figure 3A:
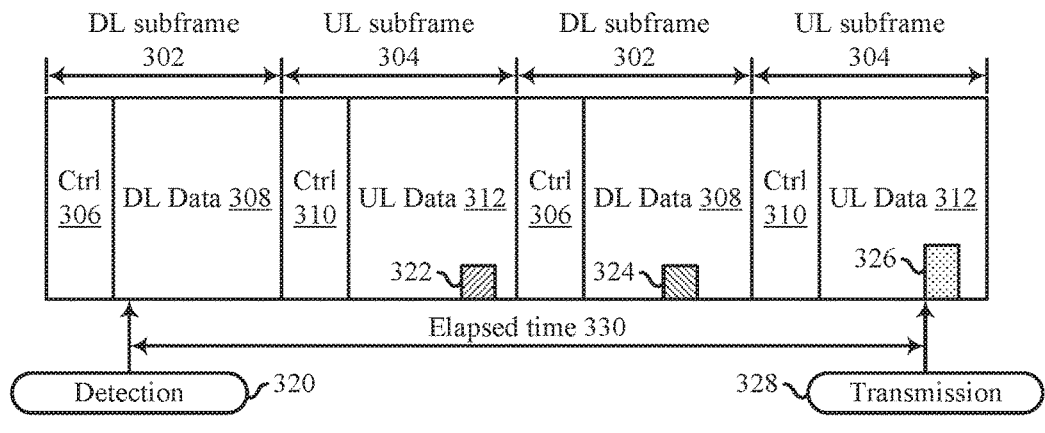
FIGS. 3A-3C illustrate examples of resource structures that support traffic-priority-based silencing techniques for interference mitigation in accordance with aspects of the present disclosure.

FIG. 3A illustrates an example of a resource structure 300 for traffic-priority-based silencing techniques for interference mitigation. The resource structure 300 shows an example of a resource allocation procedure of a wireless communication system. The resource structure 300 may include a number of subframes, such as downlink (DL) subframes 302 and uplink (UL) subframes 304. The subframes 302, 304 may comprise a set of frequency resources over a period of time. The DL subframes 302 may include a control portion 306 and a data portion 308. In some examples, the control portion 306 may be PDCCH and the data portion 308 may be a physical downlink shared channel (PDSCH). The UL subframes 304 may include a control portion 310 of communication resources and a data portion 312 of communication resources. In some examples, the control portion 310 may be a physical uplink control channel (PUCCH) and the data portion 312 may be a physical uplink shared channel (PUSCH).

Some resource allocation procedures may include: (1) detecting high-priority data to be transmitted, (2) transmitting a scheduling request to a base station 105 requesting communication resources, (3) receiving a resource grant from the base station, and (4) transmitting the data using the resources indicated by the resource grant. Thus, up to four cycles (e.g., subframes) may occur between the detection of data at a UE 115-*a* and when the data is transmitted by the UE, which may exceed the performance metrics of certain high-priority traffic. In some cases, such a procedure may take up to ten milliseconds for the base station 105 to receive the high-priority traffic, much greater than the 500 microseconds associated with some low-latency communications.

Resource structure 300 illustrates an example of a resource allocation procedure that may occur in the context of resource structures depicted. At time 320, the UE 115-*a* (e.g., a UE capable of generating high-priority traffic) may detect or identify data to be transmitted to the base station 105. In some examples, the data may be high-priority data. The data may be generated at the UE 115-*a* or it may be received from other network entities in other communications (e.g., a device-to-device communication between UEs or from another base station).

After identifying the data to be transmitted, the UE 115-*a* may transmit a scheduling request 322 to the base station 105 during a UL subframe 304. The scheduling request 322 may indicate that the UE 115-*a* has data to be transmitted to the base station 105. In addition, the scheduling request 322 may indicate characteristics of the data requesting transmission, such as the size of the data, performance metrics associated with the type of data, or combinations thereof.

The base station 105 may transmit a resource grant 324 to the UE 115-*a* during a DL subframe 302. The resource grant 324 may allocate communication resources (e.g., uplink resources) to the UE 115-*a* to transmit the data. The UE 115-*a* may transmit the data 326 to the base station 105 using the communication resources indicated in the resource grant 324. In some examples, the communication resources included in the resource grant 324 may overlap with semi-persistent resources 345.

An elapsed time 330 extends between the detection time 320 and a transmission time 328 of the data 326. If the data 326 was high-priority data, the elapsed time 330 may be longer than a latency performance metric of the data 326 requests that the data be transmitted. For example, a latency performance metric of high-priority data may indicate that the high-priority data should be transmitted to its destination within a certain amount of time from detection, for example, 500 microseconds. The elapsed time 330 associated with scheduling communication resources in the resource allocation procedure may be to 10 milliseconds. To satisfy some performance metrics, high-priority traffic may be given grant-less access to certain resources that are semi-persistently scheduled.

Figure 3B:
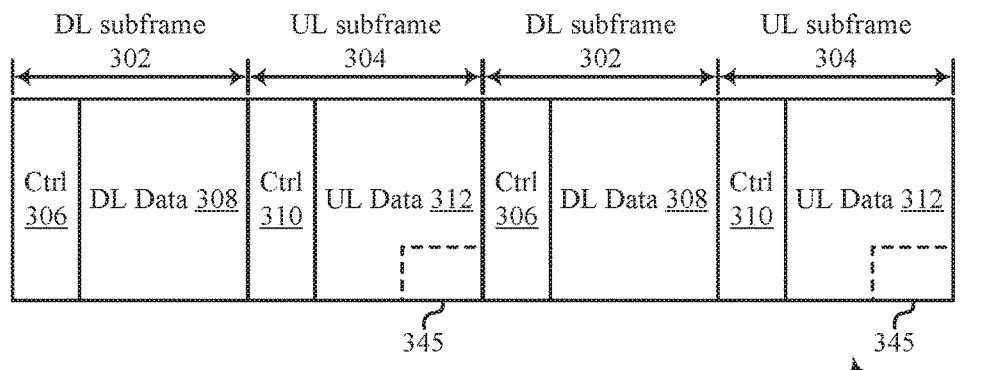

FIG. 3B illustrates an example of a resource structure 340 for traffic-priority-based silencing techniques for interference mitigation. The resource structure 340 shows how certain communication resources may be identified as semi-persistent resources 345 reserved for use by high-priority traffic. The semi-persistent resources 345 may be predetermined based at least in part on the amount of high-priority traffic that may be handled by the base station 105.

Semi-persistent resources may refer to resources that are reserved for an intended purpose. However, when the semi-persistent resources 345 are not needed for the intended purpose, the semi-persistent resources 345 may be allocated to other purposes. Hence, the resources are semi-persistent rather than persistent. In some cases, the semi-persistent resources 345 may be reserved for use by high-priority traffic such as low-latency packets or URLLC packets. The semi-persistent resources 345 may be selected from uplink resources of the wireless communication system. In some examples, however, semi-persistent resources reserved for high-priority traffic may be selected from downlink resources.

A base station 105 may receive an indication that at least one UE communicating with the base station 105 is capable of generating high-priority traffic (e.g., UE 115-*a*). The base station 105 may determine semi-persistent resources reserved for the grant-less access of high-priority traffic based on receiving the indication. The indication may be received via a reporting message. The transmitting UE 115-*a* may execute a discovery procedure to determine which UEs also communicating with the base station 105 (e.g., UE 115-*b* or UE 115-*c*) may need to be silenced to make way for high-priority traffic.

The semi-persistent resources 345 may be selected based on a number of factors. For example, a base station 105 may determine the semi-persistent resources 345 after receiving an indication from a UE 115 that the UE is capable of generating high-priority traffic. The selection of semi-persistent resources 345 may be based on the number of UEs capable of generating high-priority traffic in the coverage area, the locations of those UEs, the total amount of resources available for communication, network traffic and estimated network traffic for the communication system, the amount of non-high-priority traffic, other factors, or combinations thereof.

Figure 3C:
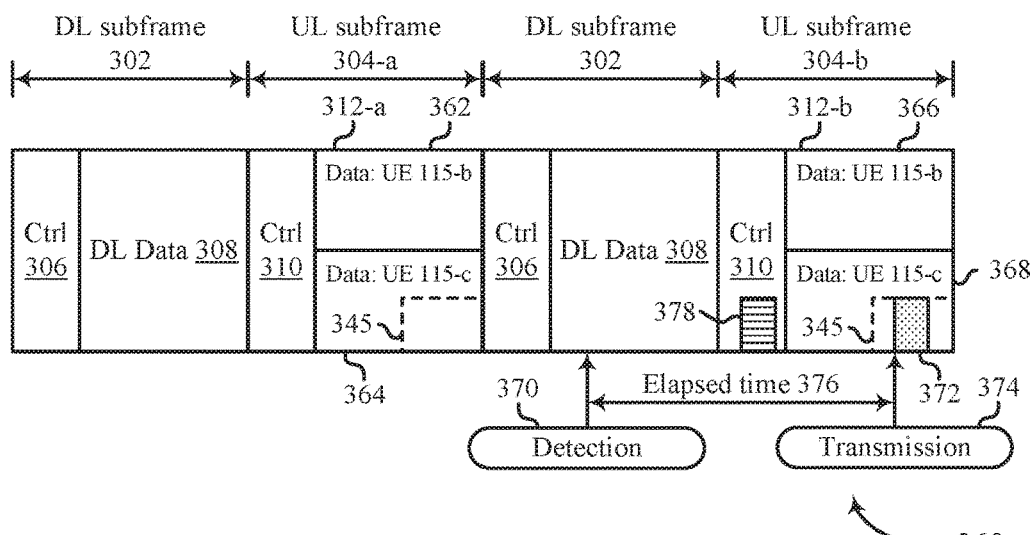

FIG. 3C illustrates an example of a resource structure 360 for traffic-priority-based silencing techniques for interference mitigation. The resource structure 360 shows an example of a resource allocation procedure of a wireless communication system using semi-persistent resources 345 reserved for high-priority traffic.

As shown in UL subframe 304-a, the base station 105 has allocated uplink communication resources 312-a to data 362 transmitted by UE 115-b and data 364 transmitted by UE 115-c. In the illustrative example, the communication resources allocated to data 364 includes the semi-persistent resources 345 reserved for high-priority traffic. However, high-priority traffic was not transmitted during the semi-persistent resources 345 in UL subframe 304-a. Therefore, no collisions occurred between data 364 and high-priority traffic.

As shown in UL subframe 304-b, the base station 105 has allocated uplink communication resources 312-b to data 366 transmitted by UE 115-b and data 368 transmitted by UE 115-c. In the illustrative example, the communication resources allocated to data 368 overlap at least partially with the semi-persistent resources 345 reserved for high-priority traffic. In the UL subframe 304-b, high-priority traffic 372 was transmitted using the semi-persistent resources 345 resources. Consequently, the data 368 and the high-priority traffic 372 may interfere with one another or collide.

Interference may occur because, at time 370, the UE 115-a may detect or identify high-priority data that is to be transmitted to the base station 105. Upon detecting the high-priority data, the UE 115-a may identify its next-available set of semi-persistent resources 345 to transmit the high-priority data. At time 374, the UE 115-a may transmit the high-priority traffic 372 using the semi-persistent resources 345 of the UL subframe 304-b without receiving a grant of resources from the base station 105. Because data 368 was previously scheduled to use the semi-persistent resources 345 of the UL subframe 304-b, the high-priority traffic 372 and the data 368 may interfere or collide with one another without additional signaling.

To account for the possibility of collisions and interference, the transmitting UE 115-a may transmit a silencing message 378 to other UEs (e.g., receiving UE 115-c). After detecting the high-priority data at time 370, the transmitting UE 115-a may generate the silencing message 378. The silencing message 378 may request that the other UEs release any scheduled communication resources that overlap with the semi-persistent resources 345. In this manner, the transmitting UE 115-a may mitigate potential sources of interference while transmitting the high-priority traffic 372 without scheduling specific resources to do so. The silencing message 378 may be transmitted during a control portion 310 of a UL subframe 312-b. In some examples, the silencing message 378 may be a D2D message.

In the illustrative example of FIG. 3C, the receiving UE 115-c may release the scheduled communication resources originally allocated for data 368. In some examples, the receiving UE 115-c may release only a portion of the communication resources allocated to data 368. Because the communication resources allocated to data UE 115-b do not overlap with the semi-persistent resources 345, even if the UE 115-b receives the silencing message 378, the UE 115-b may not release the communication resources. The silencing message 378 may be an example of the silencing message 220 described with reference to FIG. 2.

Figure 4:
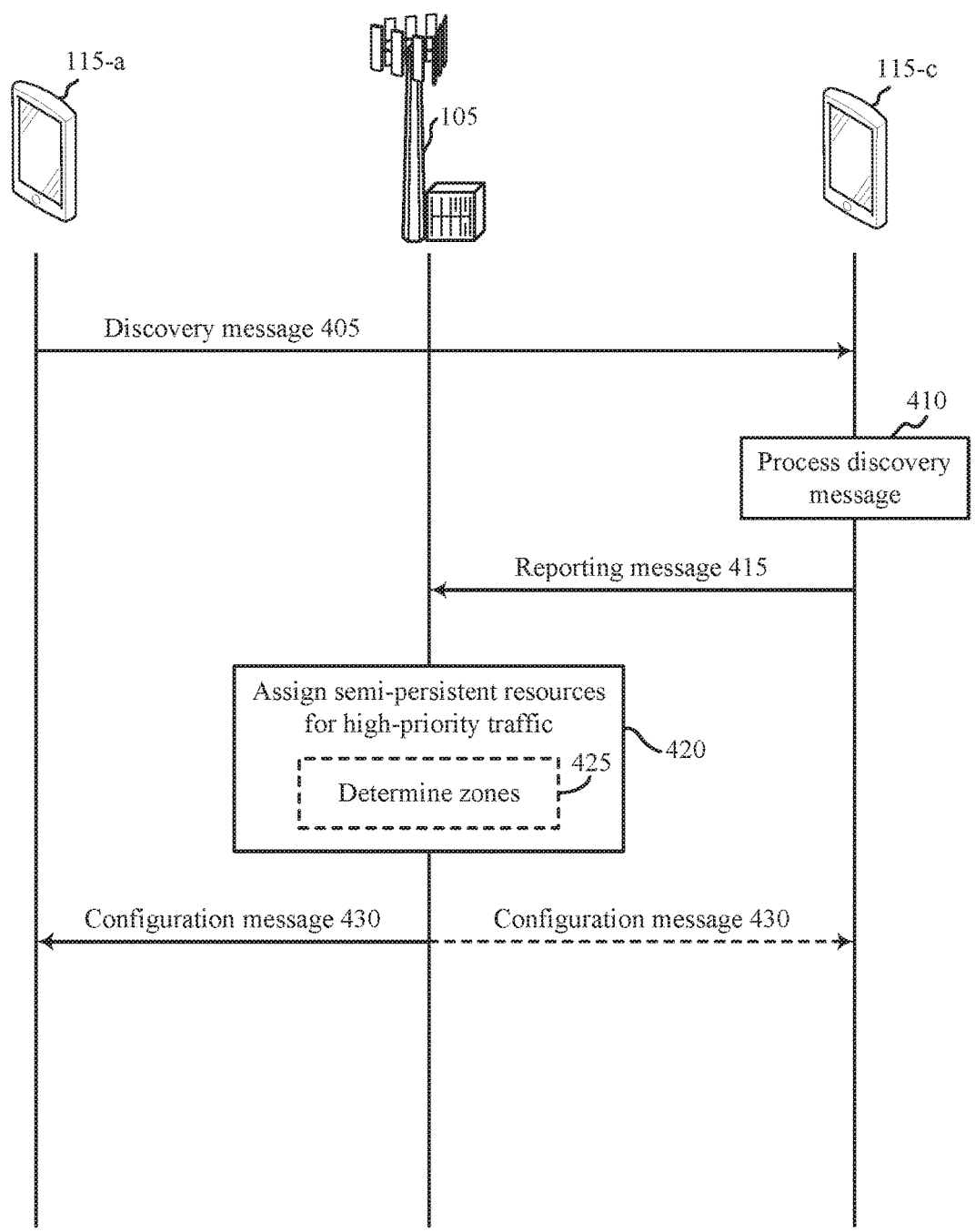
FIG. 4 illustrates an example of a discovery procedure that supports traffic-priority-based silencing techniques for interference mitigation in accordance with aspects of the present disclosure.

FIG. 4 illustrates an example of a discovery procedure 400 for traffic-priority-based silencing techniques for interference mitigation. The discovery procedure 400 may both alert a base station 105 to which UEs 115 are capable of generating high-priority traffic and associate other UEs (e.g., the receiving UE 115-c) with the UEs capable of generating high-priority traffic (e.g., the transmitting UE 115-a). To accomplish these dual goals of the discovery procedure 400, a transmitting UE 115-a may transmit a D2D discovery message 405 directly to other UEs 115 (e.g., receiving UE 115-c), rather than alerting the base station 105 directly that the UE 115-a is capable of generating high-priority traffic.

The transmitting UE 115-a may generate and broadcast a discovery message 405 to other UEs 115 (e.g., the receiving UE 115-c). The discovery message 405 may be configured to inform other UEs 115 that the transmitting UE 115-a is capable of generating high-priority traffic. As such, in some examples, the discovery message 405 may be transmitted only by UEs 115 that are capable of generating high-priority traffic. The discovery message 405 may be a D2D communication transmitted directly from one UE 115 (e.g., the transmitting UE 115-a) to another UE 115 (e.g., the receiving UE 115-c).

The discovery message 405 may include information relevant to the discovery procedure. For example, the discovery message 405 may include an identification number of the UE 115 that transmits the discovery message 405. The discovery message 405 may include an indication that the transmitting UE 115-a is a mission-critical UE or a UE capable of generating high-priority traffic. In some examples, the discovery message 405 may include an indication about which base station 105 the transmitting UE 115-a is communicating with. In some instances, the discovery message 405 may be received by UEs that communicate with a different base station 105 than the one communicating with the transmitting UE 115-a. In such instances, the UEs 115 may disregard the discovery message 405. In some examples, the discovery message 405 may include location information about the location of the transmitting UE 115-a (e.g., coordinates in a coordinate system such as a geographic coordinate system that includes latitude and longitude). In some examples, the discovery message 405 includes other types of information related to the discovery process.

The transmitting UE 115-a may broadcast the discovery message 405 to other UEs generally. In some examples, any UE 115 in the broadcast radius of the transmitting UE 115-a may receive the broadcast message. In some examples, the broadcast radius of the transmitting UE 115-a may be based on the pathloss of the discovery message 405 as it propagates through space. In some examples, the discovery message 405 may be transmitted by the transmitting UE 115-a in a periodic manner.

At block 410, the receiving UE 115-c (or any UE 115 that receives the discovery message 405) may process the discovery message 405. Processing the discovery message may include decoding the discovery message 405, determining whether receiving UE 115-c communicates with the same base station 105 as the transmitting UE 115-a, determining whether discovery message 405 is relevant to the receiving UE 115-c, or combinations thereof. In some examples, the receiving UE 115-c may determine a received power level of the discovery message 405. If the received power level does not satisfy a power level threshold, the receiving UE 115-c may determine that the discovery message 405 need not be reported to the base station 105.

The receiving UE 115-c may generate and transmit a reporting message 415 to the base station 105 in response to receiving a discovery message 405. The reporting message 415 may indicate to the base station 105 that the transmitting UE 115-a is capable of generating high-priority traffic. In this manner, the base station 105 may indirectly identify which UEs 115 are capable of generating high-priority traffic. In addition, the reporting message 415 may link the receiving UE 115-c with the transmitting UE 115-a. The reporting message 415 may also indicate that the receiving UE 115-c capable of receiving messages transmitted by the transmitting UE 115-a.

In some examples, the reporting message 415 may include an identification number of the receiving UE 115-c, an identification number of the transmitting UE 115-a, location information related to either the receiving UE 115-c, the transmitting UE 115-a, or both, other information, or combinations thereof. Using the reporting message 415, the base station 105 may determine semi-persistent resources to allocate to be used by high-priority traffic. In some examples, the receiving UE 115-c transmits reporting messages 415 based on receiving a discovery message 405 from another UE 115. In other examples, the receiving UE 115-c transmits reporting messages in a periodic manner.

In some examples, the discovery message 405 or the reporting message 415 may be transmitted on dedicated channels. For example, the discovery message 405 or the reporting message 415 may be transmitted using a physical uplink control channel (PUCCH). In some examples, the discovery procedure 400 may take place using a slow time scale.

At block 420, the base station 105 may assign semi-persistent resources to be used by UEs to transmit high-priority traffic. The base station 105 may determine the semi-persistent resources based on information included in reporting messages 415 that have been received. The semi-persistent resources assigned by the base station 105 may be examples of the semi-persistent resources 345 described with reference to FIGS. 3B and 3C.

As part of determining semi-persistent resources, at block 425, the base station may also determine zones of protection. The zones of protection may comprise a geographic area of the coverage area 110 of the base station 105. Different semi-persistent resources may be associated with different zones of protection. In this manner, the impact of a silencing message may be limited to UEs within the with zone of protection. In some examples, the zone of protection may include more than one UE 115 capable of generating high-priority traffic. The zones of protection are further illustrated with reference to FIG. 5.

In some examples, the base station 105 may generate a table of protections zones based on the information included in the reporting messages 415. The table may include a field listing the zone of protection, a field listing the semi-persistent resources associated with the zone of protection, a field listing the UEs capable of generating high-priority traffic associated with the zone, the normal UEs associated with the zone, or combinations thereof. The base station 105 may generate messages such as a configuration message 430 or a resource grant 605 based on the information in the table.

The base station 105 may generate and transmit a configuration message 430 that indicates which communication resources have been reserved for use by high-priority traffic in a semi-persistent manner (e.g., the semi-persistent resources). In some examples, the configuration message 430 may also indicate the zone assigned to the UE 115 that receives the configuration message 430 and specifies which semi-persistent resources are associated with each zone. The configuration message 430 may also include information related to the table of protection zones.

The base station 105 may transmit the configuration message 430 to the transmitting UE 115-a to inform the transmitting UE 115-a which communication resources it can use to transmit high-priority traffic without scheduling the resources (e.g., the semi-persistent resources). In some examples, the base station 105 may transmit the configuration message 430 to other UEs (e.g., receiving UE 115-c) that are within zones of protection. In other examples, however, the base station 105 does not transmit a configuration message 430 to the affected UEs 115, but rather includes information related to the semi-persistent resources and the zones of protection in resource grants.

Figure 5:
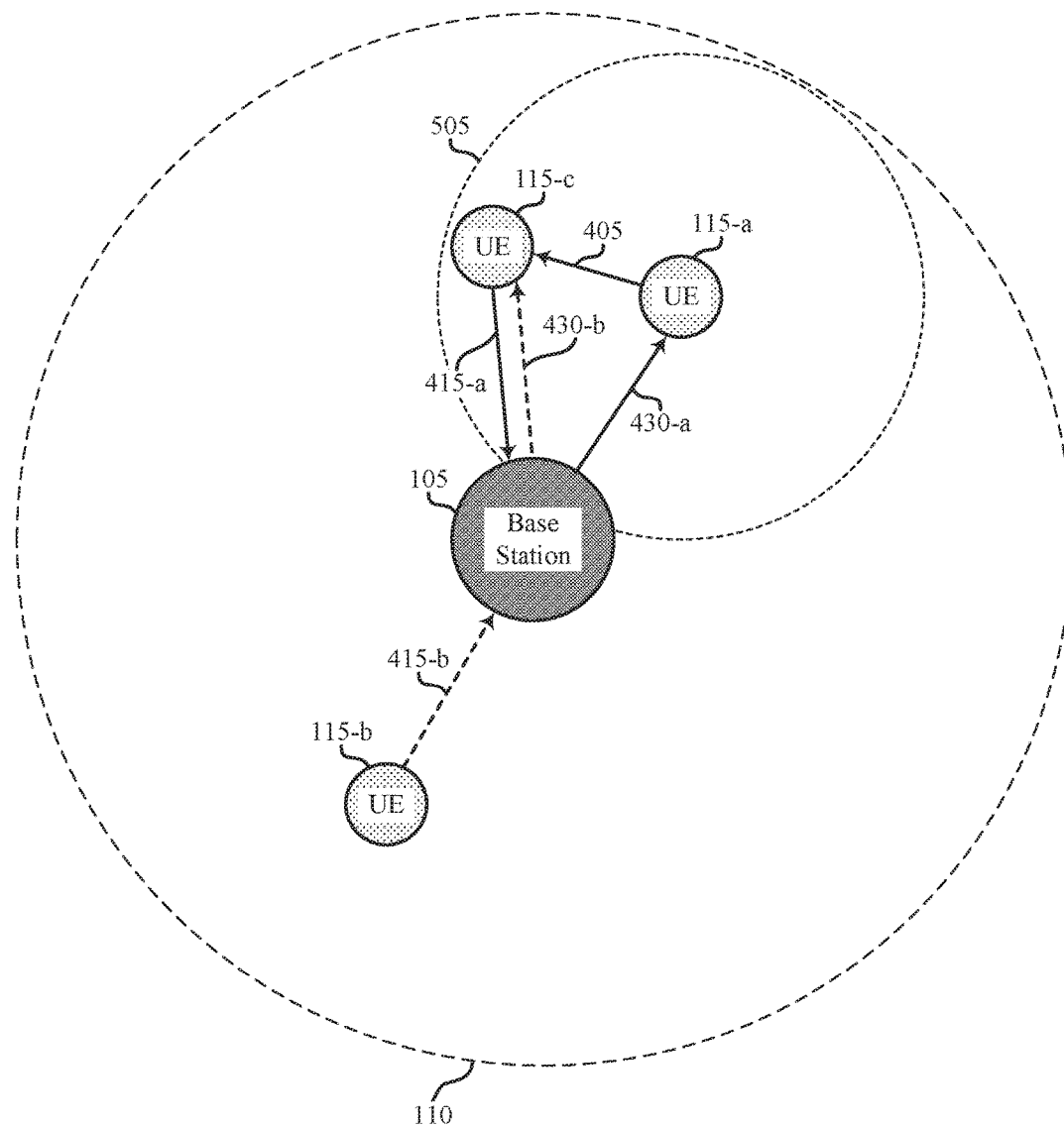
FIG. 5 illustrates an example of a wireless communication system that supports traffic-priority-based silencing techniques for interference mitigation in accordance with aspects of the present disclosure.

FIG. 5 illustrates an example of a wireless communication system 500 that implements the discovery procedure 400 for traffic-priority-based silencing techniques for interference mitigation. The transmitting UE 115-a may broadcast the discovery message 405. The receiving UE 115-c may transmit a reporting message 415-a indicating that it has discovered the transmitting UE 115-a that is capable of generating high-priority traffic. The UE 115-a may also transmit a reporting message 415-b. However, the reporting message 415-b may indicate that no UE capable of generating high-priority traffic has been detected. In some examples, the reporting message 415-b is not transmitted at all.

Based on receiving the reporting messages 415-a or 415-b (or lack thereof), the base station 105 may generating a zone 505 of protection for the transmitting UE 115-a. The zone 505 may be based on a single UE. In some examples, the zone is generated based on location information in the discovery message 405 or the reporting messages 415. In some examples, the zone 505 is a geographic area formed from the coverage area 110 of the base station 105.

Semi-persistent resources reserved for use by high-priority traffic are associated with each zone. When a UE 115 is in the zone 505, any scheduled communication resources that overlap with the semi-persistent resources may be silenced based on receiving a silencing message from a UE 115 capable of generating high-priority traffic in the zone 505.

In some examples, a second UE capable of generating high-priority traffic is communicating with the base station 105 in addition to the transmitting UE 115-a. In such examples, the base station 105 may assign multiple sets of semi-persistent resources and generate multiple zones of protection. For instance, the base station 105 may receive a reporting message 415 that indicates this second UE is capable of generating high-priority traffic. The base station 105 may assign semi-persistent resources for the second UE and/or may generate an additional zone 505 of protection associated with the second UE. In some examples, the base station 105 may determine whether the transmitting UE 115-a and the second UE should be in the same zone 505 and use the same semi-persistent resources.

The base station 105 may transmit a configuration message 430-a to the transmitting UE 115-a. In some examples, the base station 105 may also transmit a configuration message 430-b to other UEs that are within a zone 505 of protection. In other examples, however, information regarding the semi-persistent resources and/or the zones of protection may be included in resources grants.

Figure 6:
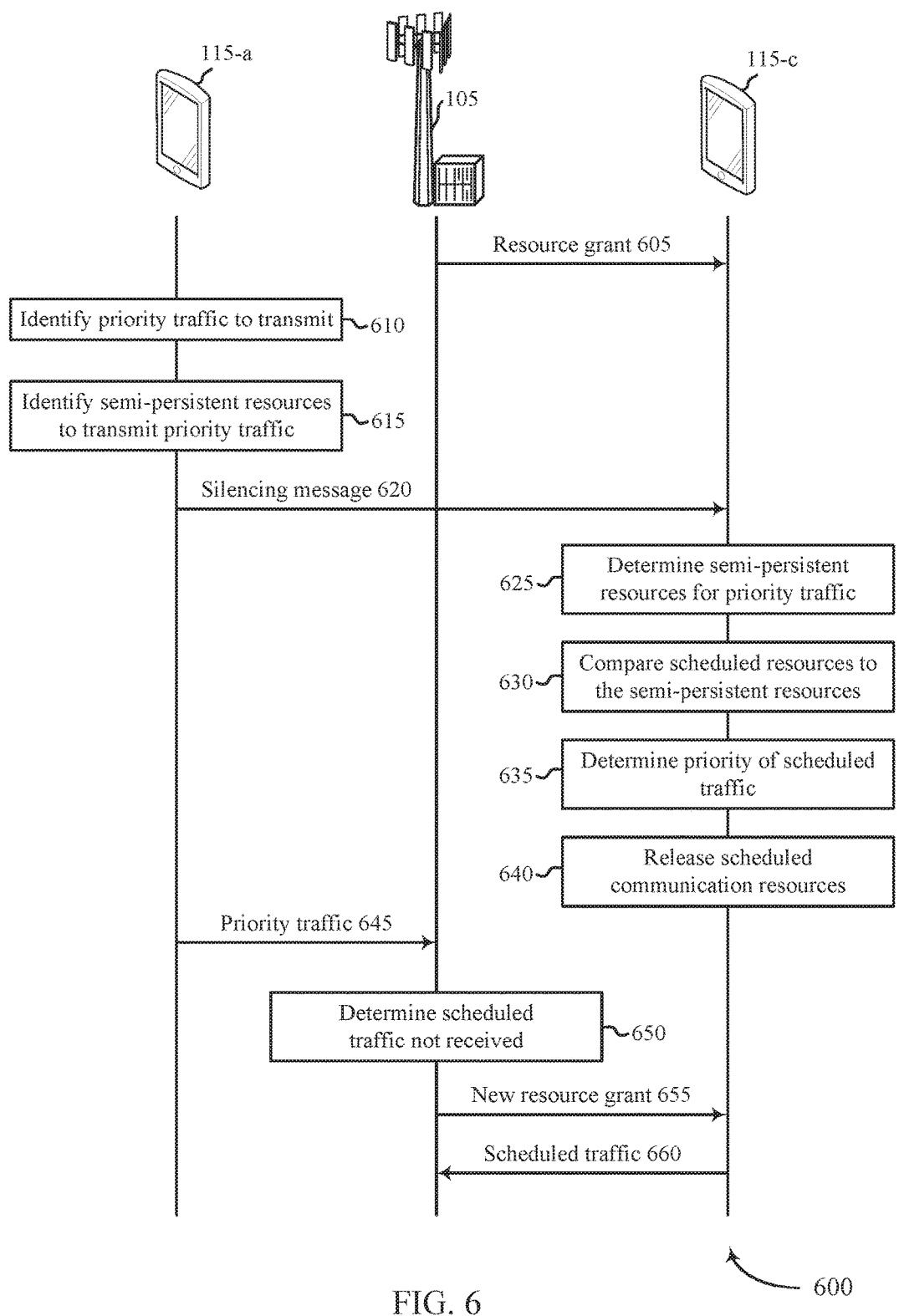
FIG. 6 illustrates an example of a signaling procedure that supports traffic-priority-based silencing techniques for interference mitigation in accordance with aspects of the present disclosure.

FIG. 6 illustrates an example of a signaling procedure 600 for traffic-priority-based silencing techniques for interference mitigation. The signaling procedure 600 may demonstrate how a UE (e.g., transmitting UE 115-a) may transmit high-priority traffic using unscheduled communication resources and mitigate interference with scheduled traffic. The signaling procedure 600 may occur after a discovery procedure 400 has been performed. As such, semi-persistent resources and/or zones of protection may have already been determined by the base station 105 prior to initiating the signaling procedure 600.

As part of the signaling procedure 600, the base station 105 may grant communication resources to the receiving UE 115-*c* via a resource grant 605. The base station 105 may transmit the resource grant 605 based on receiving a scheduling request from the receiving UE 115-*c*.

In some instances, the resource grant 605 may assign communication resources to the receiving UE 115-*c* that at least partially overlap with semi-persistent resources reserved for use by high-priority traffic. In some cases, the resource grant 605 may include information regarding the semi-persistent resources that may overlap with the assigned communication resources. For example, the resource grant 605 may include an indication that some of the communication resources overlap with semi-persistent resources, information regarding which communication resources are the semi-persistent resources, information regarding what zone the receiving UE 115-*c*, other information regarding the semi-persistent resources or zones, or combinations thereof. The information regarding the semi-persistent resources in the resource grant 605 may be a single bit in some examples. The resource grant 605 may determine from the scheduling request whether the data to be transmitted by the receiving UE 115-*c* is low-priority data. In some examples, the base station 105 may grant communication resources that at least partially overlap with the semi-persistent resources to low-priority data only, in an effort to avoid collisions between high-priority data.

At the same time that the receiving UE 115-*c* is receiving the resource grant 605 that includes communication resources that at least partially overlap with the semi-persistent resources, the transmitting UE 115-*a* may be preparing to transmit high-priority traffic. At block 610, the transmitting UE 115-*a* may identify high-priority data waiting to be transmitted to its destination.

At block 615, the transmitting UE 115-*a* may identify semi-persistent resources that it may use to transmit the high-priority traffic. As part of the identifying, the transmitting UE 115-*a* may identify performance metrics associated with the identified high-priority data. The transmitting UE 115-*a* may select which semi-persistent resources to use based at least in part on the semi-persistent resources satisfying the performance metrics of the high-priority data. For example, if two different sets of semi-persistent resources will ensure that the high-priority data arrives at its intended destination within the time frame prescribed by the performance metrics, the transmitting entity 115-*a* may use either of the semi-persistent resources. In some examples, the transmitting entity 115-*a* may identify the next available semi-persistent resources to transmit the high-priority data.

The transmitting UE 115-*a* may generate and transmit a silencing message 620 to other UEs 115 in the general area. The silencing message may be a D2D communication between UEs. The silencing message 620 may indicate to other UEs 115 that the transmitting UE 115-*a* is to communicate priority traffic using semi-persistent resources.

The silencing message 620 may include a variety of different types of information to communicate to other UEs which semi-persistent resources should be released. In some examples, the silencing message 620 may include information indicating which resources will be used by high-priority traffic. In such examples, the receiving UE 115-*c* may release the scheduled communication resources included in the message. In some examples, the silencing message 620 may indicate which zone should release its resources. In such examples, the receiving UE 115-*c* may release scheduled communication resources if the receiving UE 115-*c* is in the indicated zone. In some examples, the silencing message 620 may indicate an identifying number of the transmitting UE 115-*a*. In such examples, the receiving UE 115-*c* may release the communication resources associated with the transmitting UE 115-*a*. In some examples, the silencing message 620 may simply include information stating that other UEs should silence some resources. In such examples, the receiving UE 115-*c* may release any and all communication resources that it knows overlap with semi-persistent resources. In some examples, the silencing message 620 may include information indicating a location of the transmitting UE 115-*a*. In such examples, the receiving UEs 115-*c* may release communication resources based on a comparison of the location of the receiving UE 115-*c* to the location of the transmitting UE 115-*a*. In such examples, if a distance between the locations satisfies a threshold, the receive UE 115-*c* may release any scheduled communication resources that overlap with the semi-persistent resources. In some examples, the silencing message 620 includes information indicating the priority of the high-priority traffic or the performance metrics associated with the high-priority traffic.

In some of the examples discussed above, the receiving UE 115-*c* releases communication resources based on data already accessible to the UE 115-*c* (e.g., not included in the silencing message 620). Such information may be communicated to the receiving UE 115-*c* via a configuration message 430 or a resource grant 605. The silencing message 620 may be an example of the silencing messages 220 or 378 described with reference to FIGS. 2 and 3.

Upon receiving the silencing message 620, at block 625, the receiving UE 115-*c* may determine what semi-persistent resources reserved for use by high-priority traffic should be released. In some examples, the receiving UE 115-*c* may determine a next occurrence of the semi-persistent resources after receiving the silencing message 620. In some examples, the receiving UE 115-*c* may determine information from the silencing message 620 such as an identification number of the transmitting UE 115-*a* or an identification of a zone. The receiving UE 115-*c* may look up which communication resources to release based on the information. In some examples, the receiving UE 115-*c* may identify the semi-persistent resources to release based on information in the silencing message 620 about the semi-persistent resources.

At block 630, the receiving UE 115-*c* may compare scheduled resources allocated to the receiving UE 115-*c* to the semi-persistent resources to be released. If the receiving UE 115-*c* does not have any scheduled resources that overlap with the semi-persistent resources, the receiving UE 115-*c* may not release any communication resources. In some examples, the silencing message 620 may be received during the same transmission time interval that the portion of the communication resources are released.

At block 635, the receiving UE 115-*c* may determine the priority of the traffic scheduled to use communication resources that at least partially overlap with the semi-persistent resources. If the communication resources are being used to communicate traffic having a greater or equal priority than the high-priority traffic being transmitted by the transmitting UE 115-*a*, the receiving UE 115-*c* may not release its resources.

At block 640, the receiving UE 115-*c* may release at least in a portion of its scheduled communication resources. Releasing the communication resources may be based on receiving the silencing message 620. In some examples, releasing the communication resources may be based on any of the function described with reference to blocks 635, 630, 635, or any combinations thereof. In some examples, releasing communication resources may include refraining, by the receiving UE 115-*c*, from transmitting its scheduled traffic during the communication resources that at least partially overlap with the semi-persistent resources. In some examples, the receiving UE 115-*c* may release all communication resources allocated in a particular resource unit such as a subframe. In other examples, the receiving UE 115-*c* may release only the portion of the scheduled communication resources that overlap with the semi-persistent resources.

The transmitting UE 115-*a* may transmit the high-priority traffic 645 using the semi-persistent resources identified earlier. The transmitting UE 115-*a* may transmit the high-priority traffic 645 regardless of what traffic was scheduled to use the communication resources that are reserved as semi-persistent resources.

At block 650, the base station 105 may determine whether the scheduled low-priority traffic was received or only partially received from the receiving UE 115-*c*. In some instances, the base station 105 determines whether high-priority traffic 645 was received prior to determining whether low-priority traffic was not received. The base station 105 may determine whether the low-priority traffic scheduled to be received using the communication resources that are at least partially overlapping with the semi-persistent resources was not received.

If the scheduled low-priority traffic was not received, the base station 105 may grant an assignment of new communication resources for the low-priority traffic to the receiving UE 115-*c*. The base station 105 may transmit a new resource grant 655 to the receiving UE 115-*c* that indicates the new communication resources for the low-priority traffic. The new resource grant 655 may be an example of the resource grant 605. In some examples, only a portion of the scheduled low-priority traffic is granted the new communication resources. The UE 115-*c* may transmit the scheduled low-priority traffic 660 to the base station 105. In the new communication resources may be different from the communication resources granted in the resource grant 605. In some examples, the resource grants 605, 655 may be referred to as scheduling messages. The new resource grant 655 may reschedule the traffic that was not received.

Figure 7:
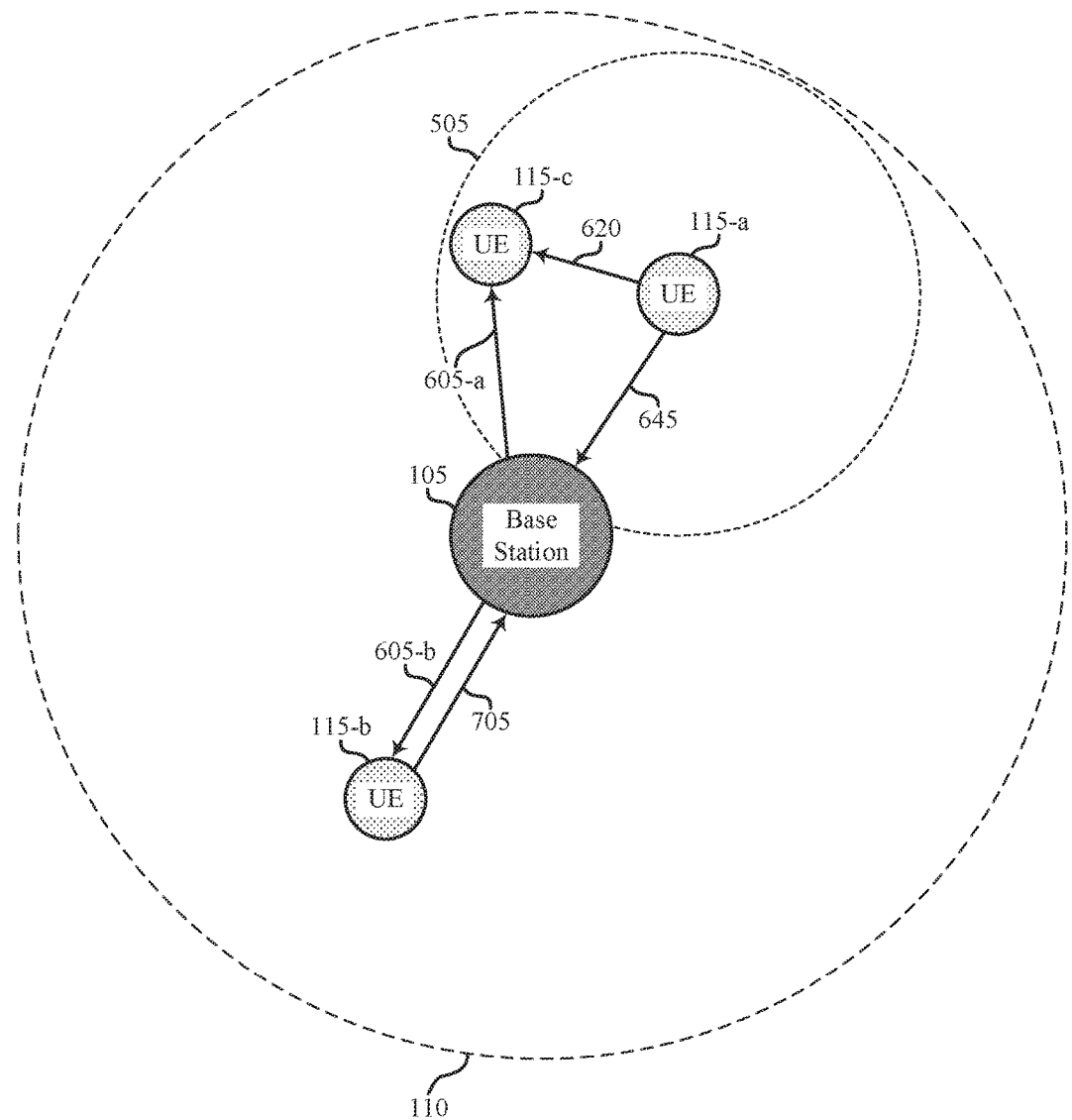
FIG. 7 illustrates an example of a wireless communication system that supports traffic-priority-based silencing techniques for interference mitigation in accordance with aspects of the present disclosure.

FIG. 7 illustrates an example of a wireless communication system 700 that implements the signaling procedure 600 for traffic-priority-based silencing techniques for interference mitigation. The wireless communication system 700 shows how the signaling procedure 600 may interact with a broader system. The wireless communication system 700 shows the signaling of the resource grants 605-*a* and 605-*b* to various UEs, the transmission of the silencing message 620 to other UEs in the zone 505 associated with the transmitting UE 115-*a*.

The wireless communication system 700 also shows that low-priority traffic 705 may be transmitted by the UE 115-*b*. The low-priority traffic 705 may be scheduled to use communication resources that at least partially overlap with the semi-persistent resources being used by the transmitting UE 115-*a* to communicate the high-priority traffic 645. However, because the UE 115-*b* is outside of the zone 505, the UE 115-*b* does not have to release its overlapping communication resources. In this manner, scheduled non-priority traffic may continue to be communicated without being interpreted by every occurrence of high-priority traffic. In some examples, the UE 115-*b* does not even receive a discovery message 405 or a silencing message 620 because the UE 115-*b* is out of range of the D2D messages transmitted by the transmitting UE 115-*a*.

Figure 8:
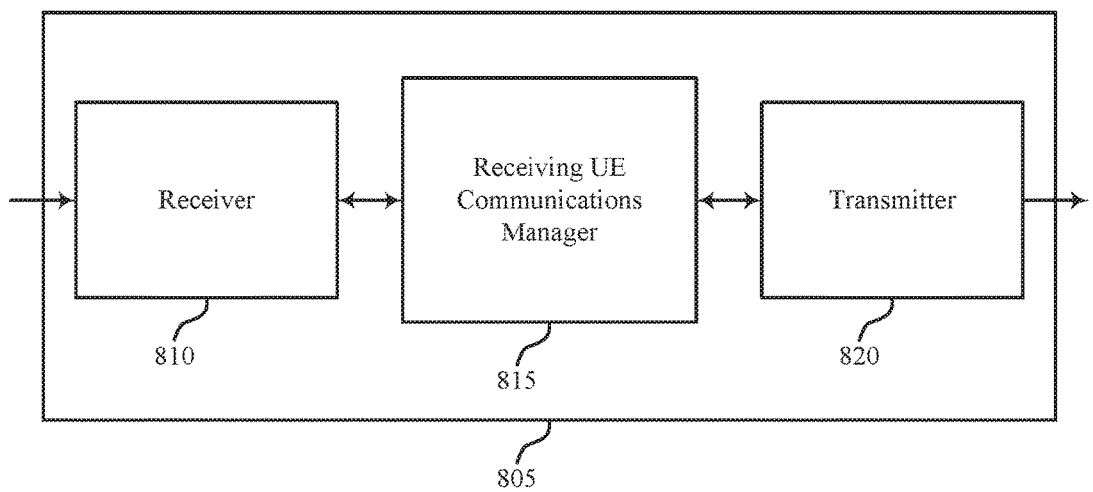
FIGS. 8 through 10 show block diagrams of a device that supports traffic-priority-based silencing techniques for interference mitigation in accordance with aspects of the present disclosure.

FIG. 8 shows a block diagram 800 of a wireless device 805 that supports traffic-priority-based silencing techniques for interference mitigation in accordance with various aspects of the present disclosure. Wireless device 805 may be an example of aspects of a receiving UE 115-*c* as described with reference to FIGS. 1-7. Wireless device 805 may include receiver 810, receiving UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to traffic-priority-based silencing techniques for interference mitigation, etc.). Information may be passed on to other components of the device. The receiver 810 may be an example of aspects of the transceiver 1135 described with reference to FIG. 11.

Receiving UE communications manager 815 may be an example of aspects of the receiving UE communications manager 1115 described with reference to FIG. 11. Receiving UE communications manager 815 and/or at least some of its various sub-components may be implemented in hardware, software executed by a processor, firmware, or any combination thereof. If implemented in software executed by a processor, the functions of the receiving UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The receiving UE communications manager 815 and/or at least some of its various sub-components may be physically located at various positions, including being distributed such that portions of functions are implemented at different physical locations by one or more physical devices. In some examples, receiving UE communications manager 815 and/or at least some of its various sub-components may be a separate and distinct component in accordance with various aspects of the present disclosure. In other examples, receiving UE communications manager 815 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Receiving UE communications manager 815 may receive, by a first UE, a grant of communication resources, receive a silencing message from a second UE, the silencing message indicating that the second UE is to communicate priority traffic using semi-persistent resources, where the semi-persistent resources at least partially overlap with the communication resources, and release at least a portion of the communication resources based on the silencing message.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
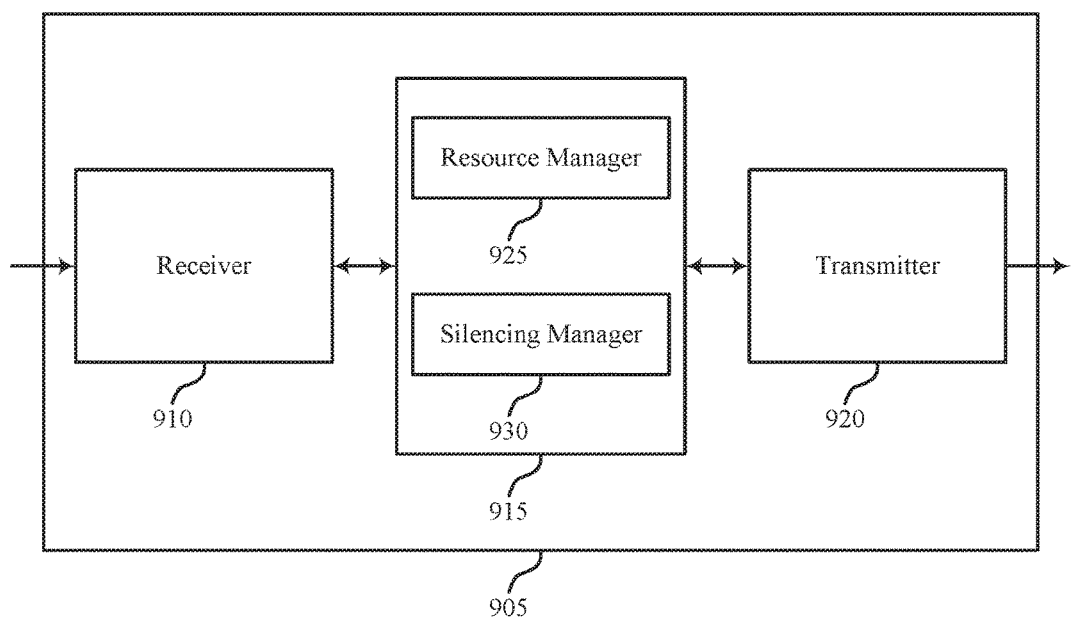

FIG. 9 shows a block diagram 900 of a wireless device 905 that supports traffic-priority-based silencing techniques for interference mitigation in accordance with various aspects of the present disclosure. Wireless device 905 may be an example of aspects of a wireless device 805 or a receiving UE 115-c as described with reference to FIGS. 1-8. Wireless device 905 may include receiver 910, receiving UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to traffic-priority-based silencing techniques for interference mitigation, etc.). Information may be passed on to other components of the device. The receiver 910 may be an example of aspects of the transceiver 1135 described with reference to FIG. 11. Receiving UE communications manager 915 may be an example of aspects of the receiving UE communications manager 1115 described with reference to FIG. 11. Receiving UE communications manager 915 may also include resource manager 925 and silencing manager 930.

Resource manager 925 may receive, by a first UE, a grant of communication resources. The resource manager 925 may determine a next occurrence of the semi-persistent resources after receiving the silencing message, where the portion of the communication resources that are released at least partially overlap with the next occurrence of the semi-persistent resources. The resource manager 925 may compare the communication resources allocated to the first UE by the grant to the semi-persistent resources associated with the second UE, where releasing the communication resources is based on the comparing. The resource manager 925 may determine that the communication resources are being used to communicate traffic having a lesser priority than the priority traffic, where releasing the communication resources is based on the determining. The resource manager 925 may receive, by the first UE, a second grant that includes new communication resources rescheduling the traffic for transmission, where the new communication resources are different from the communication resources. In some cases, the second UE is capable of generating priority traffic. In some cases, the priority traffic is low latency traffic.

Silencing manager 930 may receive a silencing message from a second UE, the silencing message indicating that the second UE is to communicate priority traffic using semi-persistent resources, where the semi-persistent resources at least partially overlap with the communication resources. The silencing manager 930 may release at least a portion of the communication resources based on the silencing message. The silencing manager 930 may refrain, by the first UE, from transmitting traffic during the communication resources based on releasing the communication resources. In some cases, the silencing message is received during the same transmission time interval that the portion of the communication resources are released.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
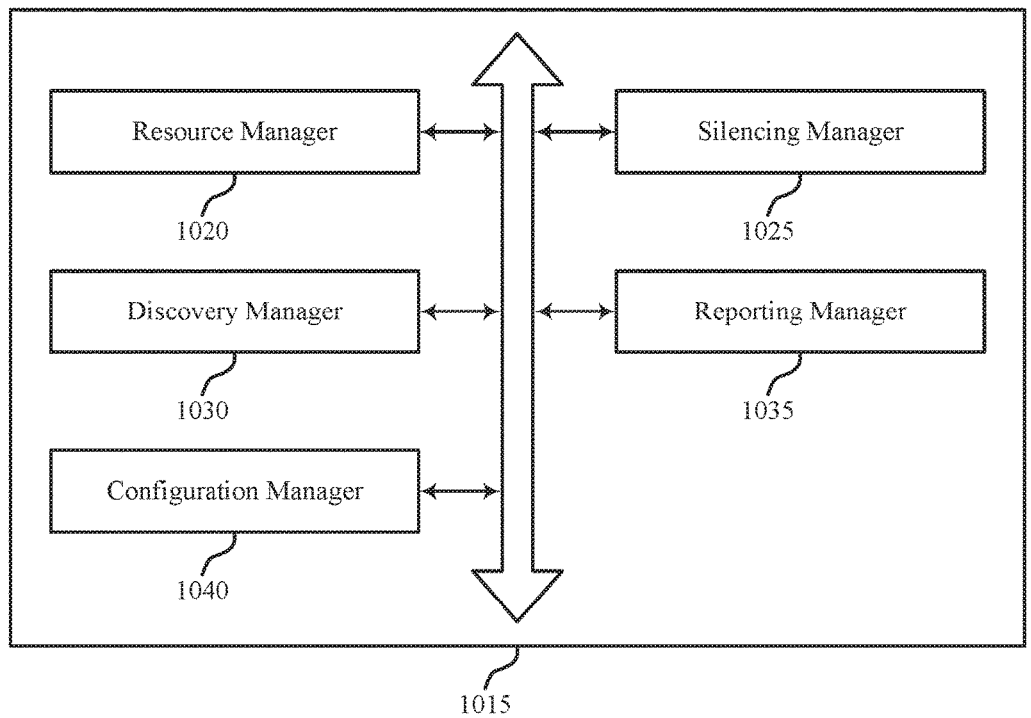

FIG. 10 shows a block diagram 1000 of a receiving UE communications manager 1015 that supports traffic-priority-based silencing techniques for interference mitigation in accordance with various aspects of the present disclosure. The receiving UE communications manager 1015 may be an example of aspects of a receiving UE communications manager 815, a receiving UE communications manager 915, or a receiving UE communications manager 1115 described with reference to FIGS. 8, 9, and 11. The receiving UE communications manager 1015 may include resource manager 1020, silencing manager 1025, discovery manager 1030, reporting manager 1035, and configuration manager 1040. Each of these modules may communicate, directly or indirectly, with one another (e.g., via one or more buses).

Resource manager 1020 may be an example of the resource manager 925 described with reference to FIG. 9. As such, the resource manager 1020 may be capable of performing the functions of the resource manager 925.

Silencing manager 1025 may be an example of the silencing manager 930 described with reference to FIG. 9. As such, the silencing manager 1025 may be capable of performing the functions of the silencing manager 930.

Discovery manager 1030 may receive a discovery message indicating that the second UE is capable of generating priority traffic. In some cases, the discovery message is a device-to-device communication received directly from the second UE. Reporting manager 1035 may transmit a reporting message to a base station indicating that the second UE has received the discovery message from the first UE.

Configuration manager 1040 may receive, from a base station, a configuration message indicating a zone assigned to the first UE and that the semi-persistent resources are associated with the zone. In some cases, the zone is based on the second UE being capable of generating priority traffic.

Figure 11:
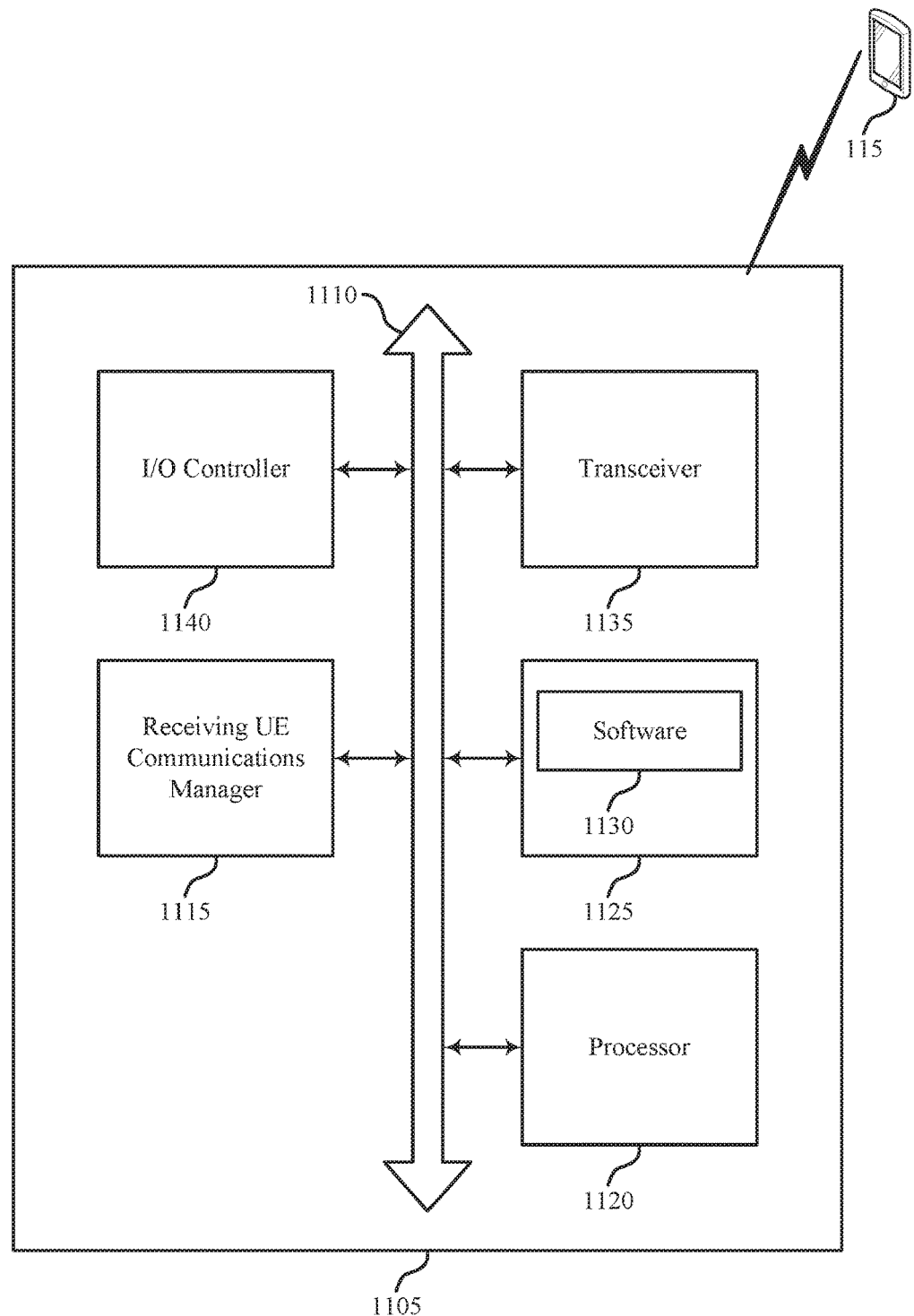
FIG. 11 illustrates a block diagram of a system including a receiving UE that supports traffic-priority-based silencing techniques for interference mitigation in accordance with aspects of the present disclosure.

FIG. 11 shows a diagram of a system 1100 including a device 1105 that supports traffic-priority-based silencing techniques for interference mitigation in accordance with various aspects of the present disclosure. Device 1105 may be an example of or include the components of wireless device 805, wireless device 905, or a receiving UE 115-c as described above, e.g., with reference to FIGS. 1-9. Device 1105 may include components for bi-directional voice and data communications including components for transmitting and receiving communications, including receiving UE communications manager 1115, processor 1120, memory 1125, software 1130, transceiver 1135, and I/O controller 1140. These components may be in electronic communication via one or more busses (e.g., bus 1110).

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting traffic-priority-based silencing techniques for interference mitigation).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support traffic-priority-based silencing techniques for interference mitigation. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

I/O controller 1140 may manage input and output signals for device 1105. I/O controller 1140 may also manage peripherals not integrated into device 1105. In some cases, I/O controller 1140 may represent a physical connection or port to an external peripheral. In some cases, I/O controller 1140 may utilize an operating system such as iOS®, ANDROID®, MS-DOS®, MS-WINDOWS®, OS/2®, UNIX®, LINUX®, or another known operating system.

Figure 12:
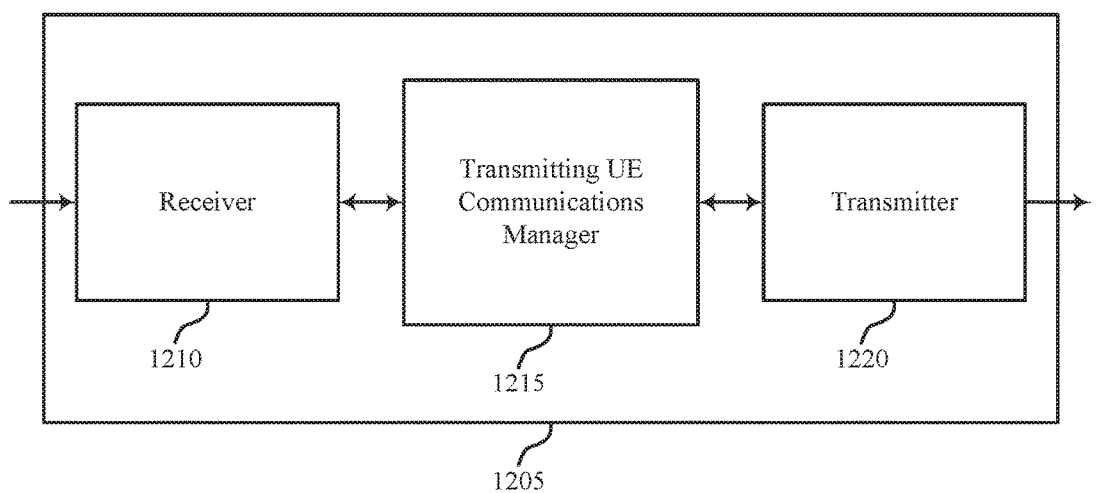
FIGS. 12 through 14 show block diagrams of a device that supports traffic-priority-based silencing techniques for interference mitigation in accordance with aspects of the present disclosure.

FIG. 12 shows a block diagram 1200 of a wireless device 1205 that supports traffic-priority-based silencing techniques for interference mitigation in accordance with various aspects of the present disclosure. Wireless device 1205 may be an example of aspects of a transmitting UE 115-*a* as described with reference to FIGS. 1-8. Wireless device 1205 may include receiver 1210, transmitting UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to traffic-priority-based silencing techniques for interference mitigation, etc.). Information may be passed on to other components of the device. The receiver 1210 may be an example of aspects of the transceiver 1535 described with reference to FIG. 15.

Transmitting UE communications manager 1215 may be an example of aspects of the transmitting UE communications manager 1515 described with reference to FIG. 15. Transmitting UE communications manager 1215 and/or at least some of its various sub-components may be implemented in hardware, software executed by a processor, firmware, or any combination thereof. If implemented in software executed by a processor, the functions of the transmitting UE communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The transmitting UE communications manager 1215 and/or at least some of its various sub-components may be physically located at various positions, including being distributed such that portions of functions are implemented at different physical locations by one or more physical devices. In some examples, transmitting UE communications manager 1215 and/or at least some of its various sub-components may be a separate and distinct component in accordance with various aspects of the present disclosure. In other examples, transmitting UE communications manager 1215 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Transmitting UE communications manager 1215 may identify, by a first UE, priority traffic to transmit to a base station, transmit, by the first UE, a silencing message to a second UE based on the identifying, the silencing message indicating to the second UE that the first UE is to communicate the priority traffic using semi-persistent resources, where the semi-persistent resources at least partially overlap with communication resources granted to the second UE, and transmit, by the first UE and to the base station, the priority traffic using the semi-persistent resources.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
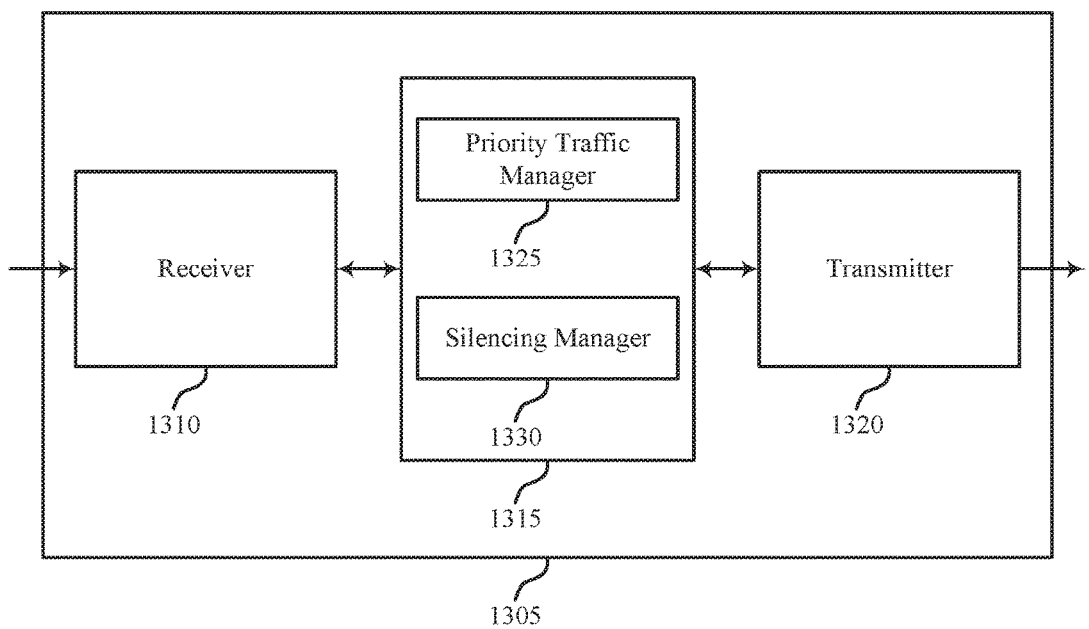

FIG. 13 shows a block diagram 1300 of a wireless device 1305 that supports traffic-priority-based silencing techniques for interference mitigation in accordance with various aspects of the present disclosure. Wireless device 1305 may be an example of aspects of a wireless device 1205 or a transmitting UE 115-*a* as described with reference to FIGS. 1-8 and 12. Wireless device 1305 may include receiver 1310, transmitting UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to traffic-priority-based silencing techniques for interference mitigation, etc.). Information may be passed on to other components of the device. The receiver 1310 may be an example of aspects of the transceiver 1535 described with reference to FIG. 15.

Transmitting UE communications manager 1315 may be an example of aspects of the transmitting UE communications manager 1515 described with reference to FIG. 15. Transmitting UE communications manager 1315 may also include priority traffic manager 1325 and silencing manager 1330.

Priority traffic manager 1325 may identify, by a first UE, priority traffic to transmit to a base station and transmit, by the first UE and to the base station, the priority traffic using the semi-persistent resources. In some cases, the priority traffic is transmitted during the first semi-persistent resources available after the silencing message is transmitted.

Silencing manager 1330 may transmit, by the first UE, a silencing message to a second UE based on the identifying, the silencing message indicating to the second UE that the first UE is to communicate the priority traffic using semi-persistent resources, where the semi-persistent resources at least partially overlap with communication resources granted to the second UE. In some cases, the silencing message is a device-to-device communication transmitted directly to the second UE.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
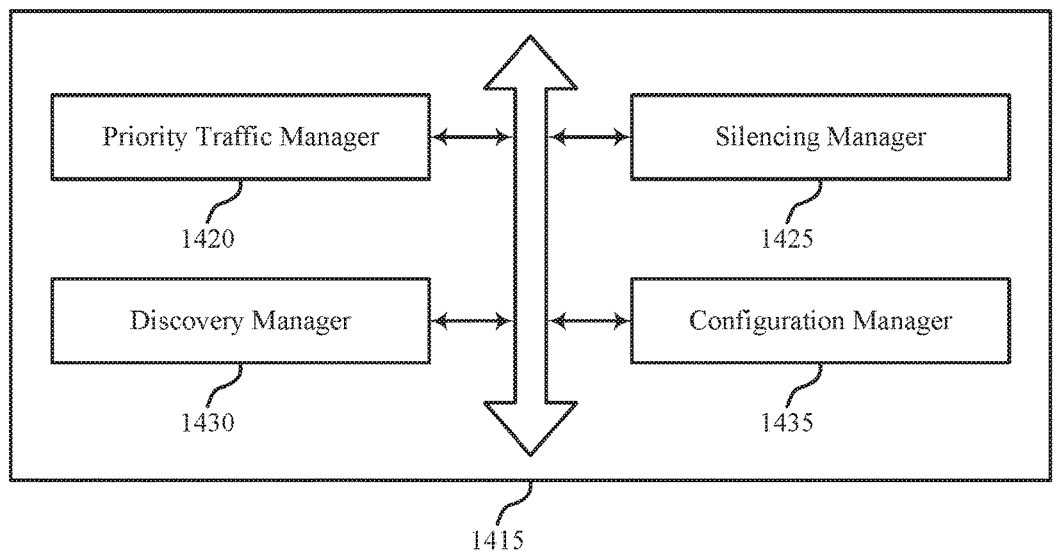

FIG. 14 shows a block diagram 1400 of a transmitting UE communications manager 1415 that supports traffic-priority-based silencing techniques for interference mitigation in accordance with various aspects of the present disclosure. The transmitting UE communications manager 1415 may be an example of aspects of a transmitting UE communications manager 1515 described with reference to FIGS. 12, 13, and 15. The transmitting UE communications manager 1415 may include priority traffic manager 1420, silencing manager 1425, discovery manager 1430, and configuration manager 1435. Each of these modules may communicate, directly or indirectly, with one another (e.g., via one or more buses).

Priority traffic manager 1420 may be an example of the priority traffic manager 1325 described with reference to FIG. 13. As such, the priority traffic manager 1420 may be capable of performing the functions of the priority traffic manager 1325.

Silencing manager 1425 may be an example of the silencing manager 1330 described with reference to FIG. 13. As such, the silencing manager 1425 may be capable of performing the functions of the silencing manager 1330.

Discovery manager 1430 may broadcast a discovery message to the second UE indicating that the first UE is capable of generating priority traffic. In some cases, the discovery message is a device-to-device communication transmitted directly to the second UE.

Configuration manager 1435 may receive, from the base station, a configuration message indicating that the semi-persistent resources are reserved for use by the priority traffic.

Figure 15:
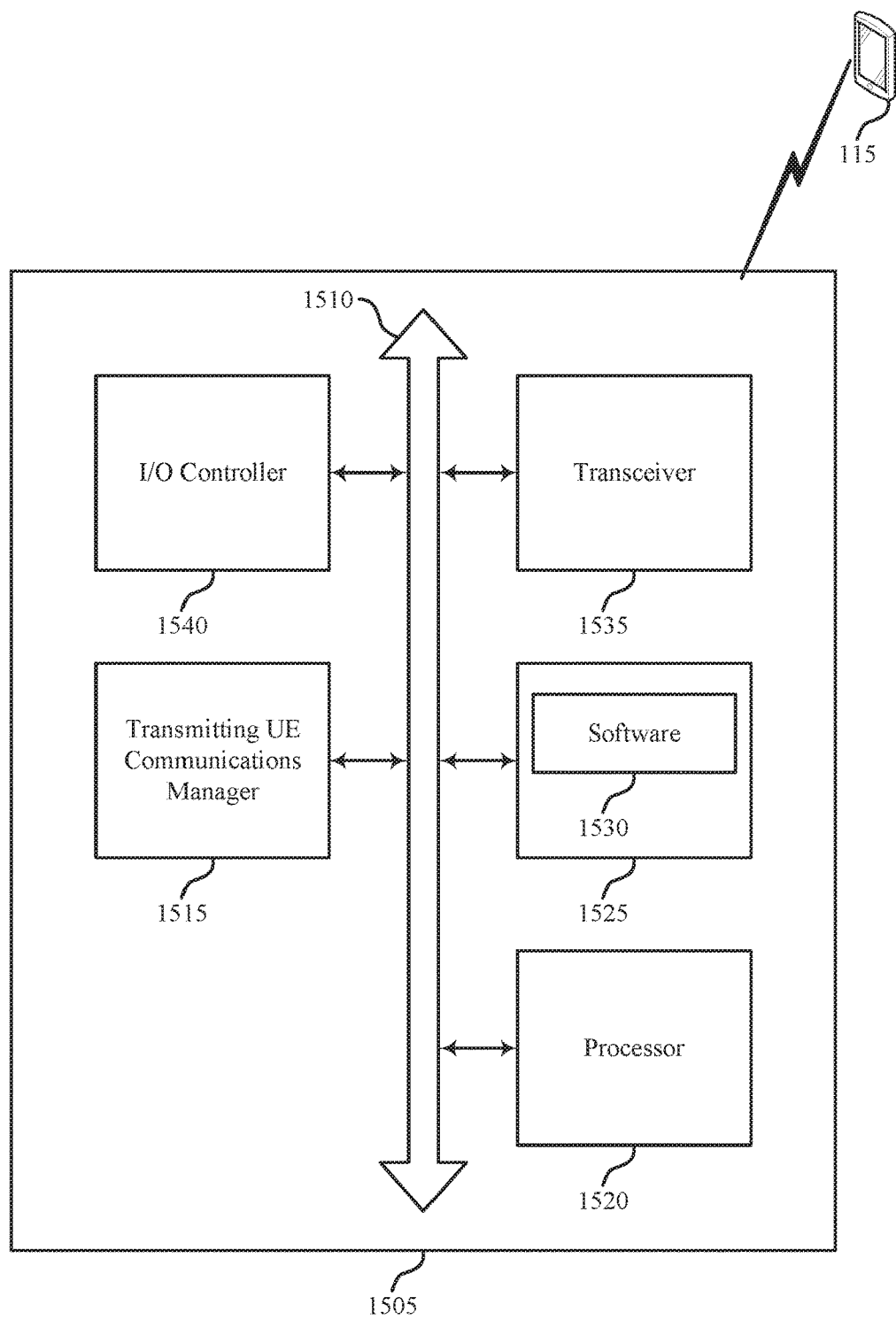
FIG. 15 illustrates a block diagram of a system including a transmitting UE that supports traffic-priority-based silencing techniques for interference mitigation in accordance with aspects of the present disclosure.

FIG. 15 shows a diagram of a system 1500 including a device 1505 that supports traffic-priority-based silencing techniques for interference mitigation in accordance with various aspects of the present disclosure. Device 1505 may be an example of or include the components of transmitting UE 115-a as described above, e.g., with reference to FIGS. 1-8 and 12. Device 1505 may include components for bi-directional voice and data communications including components for transmitting and receiving communications, including transmitting UE communications manager 1515, processor 1520, memory 1525, software 1530, transceiver 1535, and I/O controller 1540. These components may be in electronic communication via one or more busses (e.g., bus 1510).

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting traffic-priority-based silencing techniques for interference mitigation).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support traffic-priority-based silencing techniques for interference mitigation. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

I/O controller 1540 may manage input and output signals for device 1505. I/O controller 1540 may also manage peripherals not integrated into device 1505. In some cases, I/O controller 1540 may represent a physical connection or port to an external peripheral. In some cases, I/O controller 1540 may utilize an operating system such as iOS®, ANDROID®, MS-DOS®, MS-WINDOWS®, OS/2®, UNIX®, LINUX®, or another known operating system.

Figure 16:
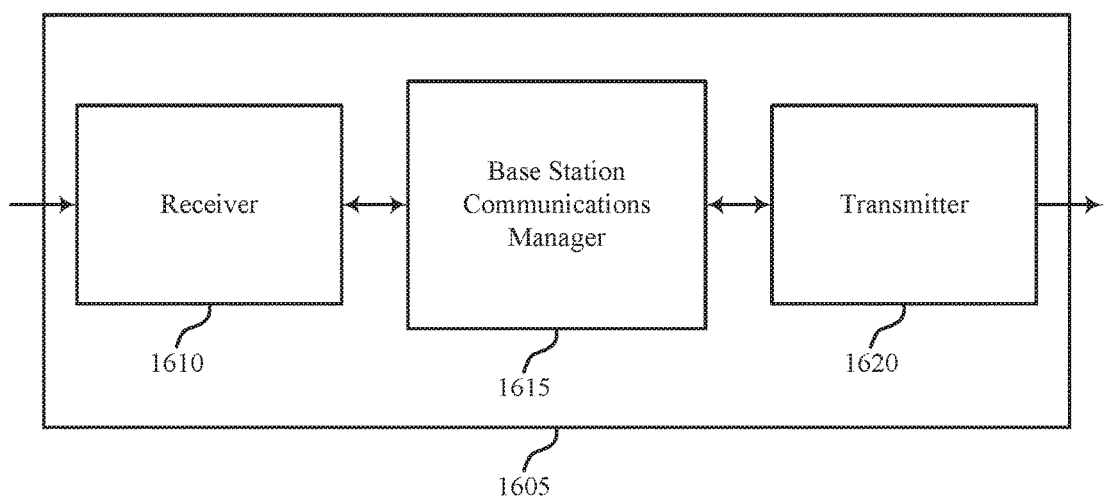
FIGS. 16 through 18 show block diagrams of a device that supports traffic-priority-based silencing techniques for interference mitigation in accordance with aspects of the present disclosure.

FIG. 16 shows a block diagram 1600 of a wireless device 1605 that supports traffic-priority-based silencing techniques for interference mitigation in accordance with various aspects of the present disclosure. Wireless device 1605 may be an example of aspects of a base station 105 as described with reference to FIGS. 1-8. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to traffic-priority-based silencing techniques for interference mitigation, etc.). Information may be passed on to other components of the device. The receiver 1610 may be an example of aspects of the transceiver 1935 described with reference to FIG. 19.

Base station communications manager 1615 may be an example of aspects of the base station communications manager 1915 described with reference to FIG. 19. Base station communications manager 1615 and/or at least some of its various sub-components may be implemented in hardware, software executed by a processor, firmware, or any combination thereof. If implemented in software executed by a processor, the functions of the base station communications manager 1615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1615 and/or at least some of its various sub-components may be physically located at various positions, including being distributed such that portions of functions are implemented at different physical locations by one or more physical devices. In some examples, base station communications manager 1615 and/or at least some of its various sub-components may be a separate and distinct component in accordance with various aspects of the present disclosure. In other examples, base station communications manager 1615 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Base station communications manager 1615 may receive, by a base station, a reporting message from a first UE indicating that the first UE is capable of receiving messages transmitted by a second UE and that the second UE is capable of generating priority traffic, assign semi-persistent resources to be used by the second UE to transmit the priority traffic, and transmit a configuration message to the second UE indicating the assigned semi-persistent resources.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may include a single antenna, or it may include a set of antennas.

Figure 17:
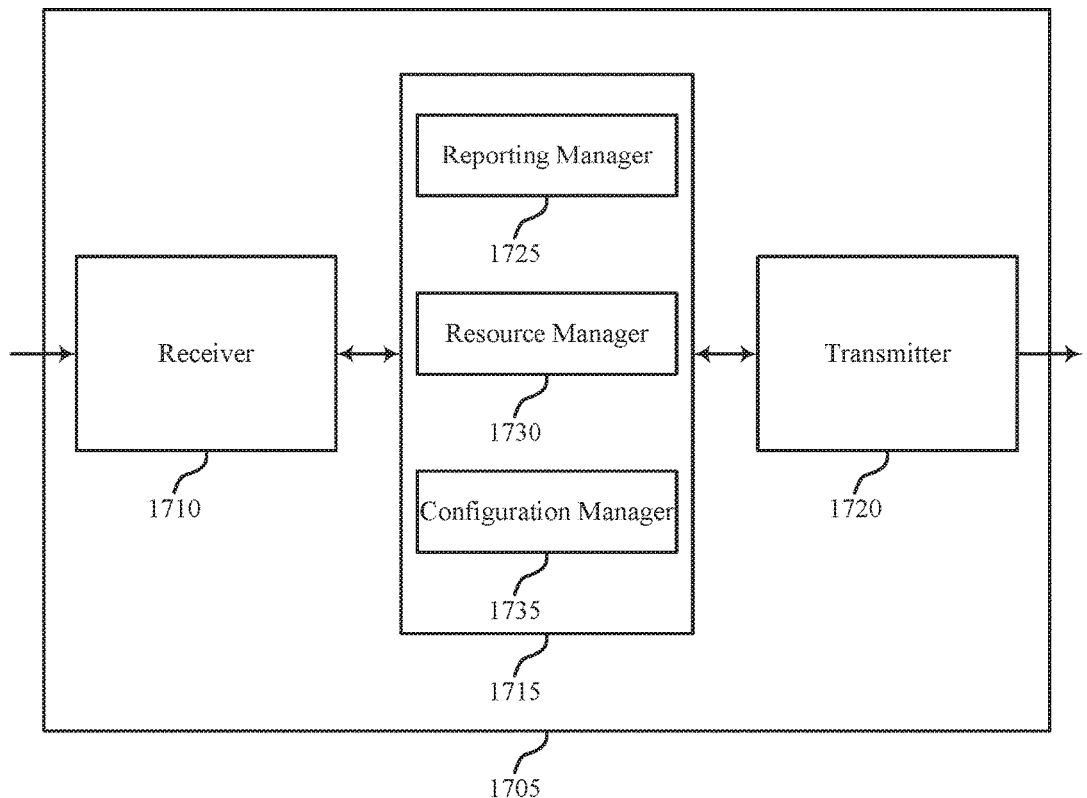

FIG. 17 shows a block diagram 1700 of a wireless device 1705 that supports traffic-priority-based silencing techniques for interference mitigation in accordance with various aspects of the present disclosure. Wireless device 1705 may be an example of aspects of a wireless device 1605 or a base station 105 as described with reference to FIGS. 1-8 and 16. Wireless device 1705 may include receiver 1710, base station communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to traffic-priority-based silencing techniques for interference mitigation, etc.). Information may be passed on to other components of the device. The receiver 1710 may be an example of aspects of the transceiver 1935 described with reference to FIG. 19.

Base station communications manager 1715 may be an example of aspects of the base station communications manager 1915 described with reference to FIG. 19. Base station communications manager 1715 may also include reporting manager 1725, resource manager 1730, and configuration manager 1735.

Reporting manager 1725 may receive, by a base station, a reporting message from a first UE indicating that the first UE is capable of receiving messages transmitted by a second UE and that the second UE is capable of generating priority traffic. The resporting manager 1725 may receive a second reporting message indicating that a third UE different from the second UE is capable of generating priority traffic, where the zone and the semi-persistent resources are based on the reporting message and the second reporting message.

Resource manager 1730 may assign semi-persistent resources to be used by the second UE to transmit the priority traffic. The resource manager 1730 may grant an assignment of communication resources to traffic generated by the first UE, the communication resources at least partially overlapping with the semi-persistent resources, where the traffic has a lower priority than the priority traffic. The resource manager 1730 may transmit a scheduling message to the first UE rescheduling the traffic based on the determining.

Configuration manager 1735 may transmit a configuration message to the second UE indicating the assigned semi-persistent resources.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may include a single antenna, or it may include a set of antennas.

Figure 18:
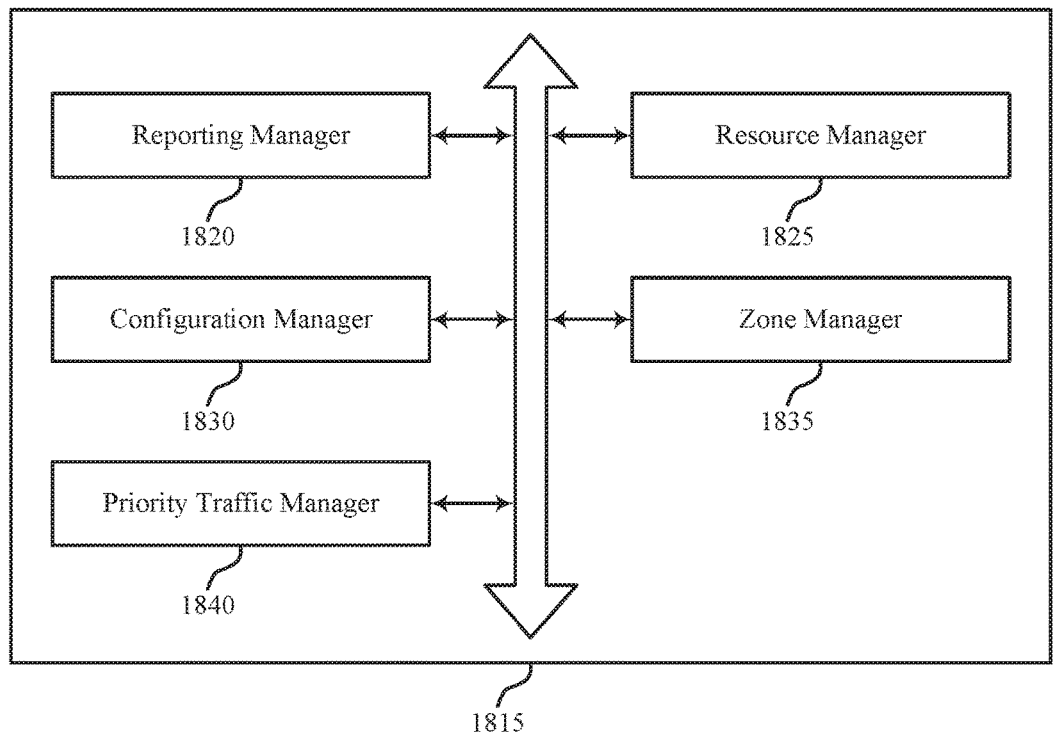

FIG. 18 shows a block diagram 1800 of a base station communications manager 1815 that supports traffic-priority-based silencing techniques for interference mitigation in accordance with various aspects of the present disclosure. The base station communications manager 1815 may be an example of aspects of a base station communications manager 1915 described with reference to FIGS. 16, 17, and 19. The base station communications manager 1815 may include reporting manager 1820, resource manager 1825, configuration manager 1830, zone manager 1835, and priority traffic manager 1840. Each of these modules may communicate, directly or indirectly, with one another (e.g., via one or more buses).

Reporting manager 1820 may be an example of the reporting manager 1725 described with reference to FIG. 17. As such, the reporting manager 1820 may be capable of performing the functions of the reporting manager 1725.

Resource manager 1825 may be an example of the resource manager 1730 described with reference to FIG. 17. As such, the resource manager 1825 may be capable of performing the functions of the resource manager 1730.

Configuration manager 1830 may transmit a configuration message to the second UE indicating the assigned semi-persistent resources.

Zone manager 1835 may generate a zone based on receiving the reporting message, the semi-persistent resources being associated with the zone, where the configuration message indicates the zone.

Priority traffic manager 1840 may receive, from the second UE, the priority traffic using at least a portion of the communication resources granted to the traffic and determine that traffic scheduled to be received using communication resources that at least partially overlap with the semi-persistent resources was not received.

Figure 19:
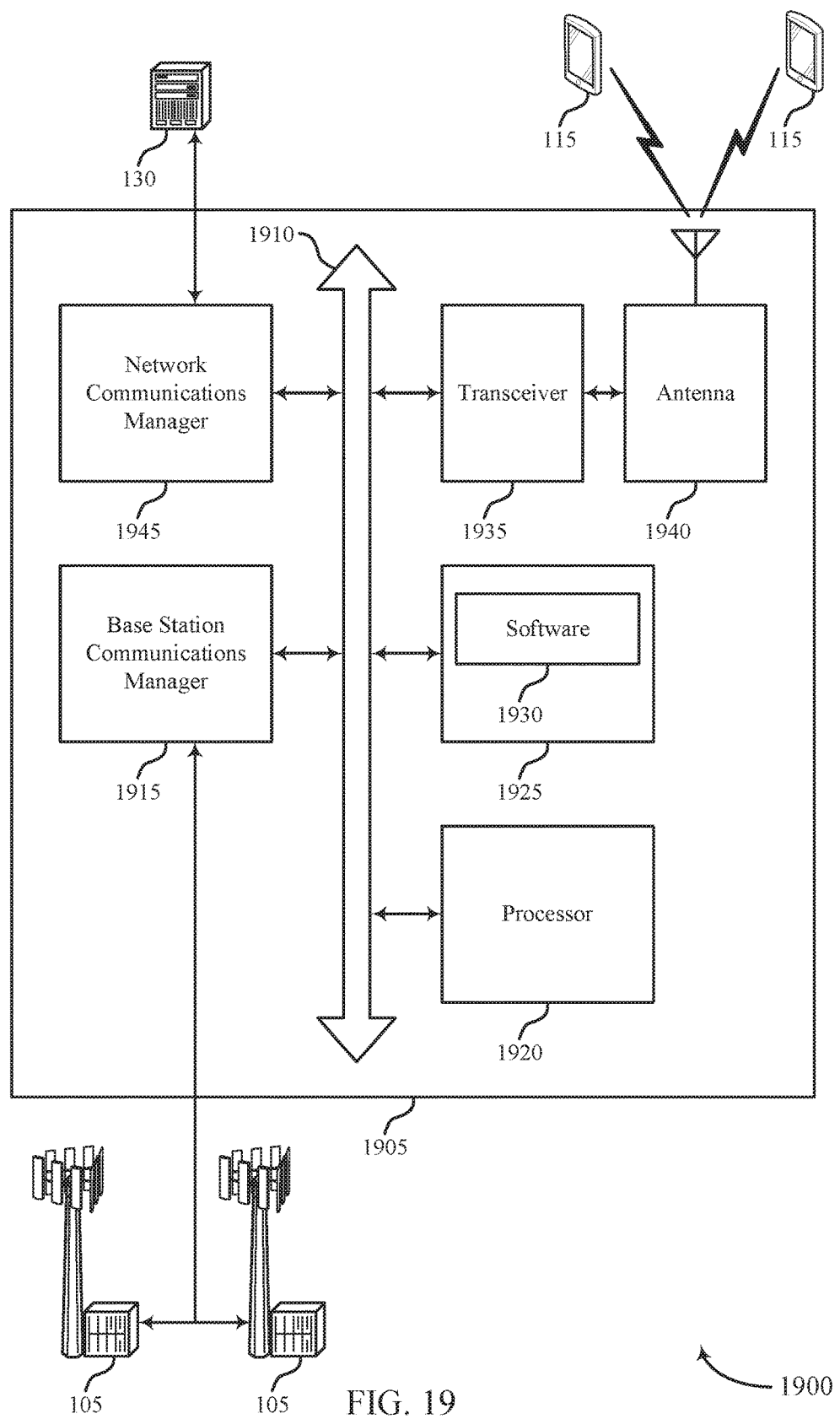
FIG. 19 illustrates a block diagram of a system including a base station that supports traffic-priority-based silencing techniques for interference mitigation in accordance with aspects of the present disclosure.

FIG. 19 shows a diagram of a system 1900 including a device 1905 that supports traffic-priority-based silencing techniques for interference mitigation in accordance with various aspects of the present disclosure. Device 1905 may be an example of or include the components of base station 105 as described above, e.g., with reference to FIGS. 1-8 and 16. Device 1905 may include components for bi-directional voice and data communications including components for transmitting and receiving communications, including base station communications manager 1915, processor 1920, memory 1925, software 1930, transceiver 1935, antenna 1940, and network communications manager 1945. These components may be in electronic communication via one or more busses (e.g., bus 1910). Device 1905 may communicate wirelessly with one or more UEs 115.

Base station communications manager 1915 may manage communications with other base station 105, and may include a controller or scheduler for controlling communications with UEs 115 in cooperation with other base stations 105. For example, the base station communications manager 1915 may coordinate scheduling for transmissions to UEs 115 for various interference mitigation techniques such as beamforming or joint transmission. In some examples, base station communications manager 1915 may provide an X2 interface within LTE/LTE-A wireless communication network technology to provide communication between base stations 105.

In some examples, base station communications manager 1915 may manage communications with other base station 105, and may include a controller or scheduler for controlling communications with UEs 115 in cooperation with other base stations 105. For example, the base station communications manager 1915 may coordinate scheduling for transmissions to UEs 115 for various interference mitigation techniques such as beamforming or joint transmission. In some examples, base station communications manager 1915 may provide an X2 interface within an LTE/LTE-A wireless communication network technology to provide communication between base stations 105.

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting traffic-priority-based silencing techniques for interference mitigation).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware and/or software operation such as the interaction with peripheral components or devices.

Software 1930 may include code to implement aspects of the present disclosure, including code to support traffic-priority-based silencing techniques for interference mitigation. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

Network communications manager 1945 may manage communications with the core network (e.g., via one or more wired backhaul links). For example, the network communications manager 1945 may manage the transfer of data communications for client devices, such as one or more UEs 115.

Figure 20:
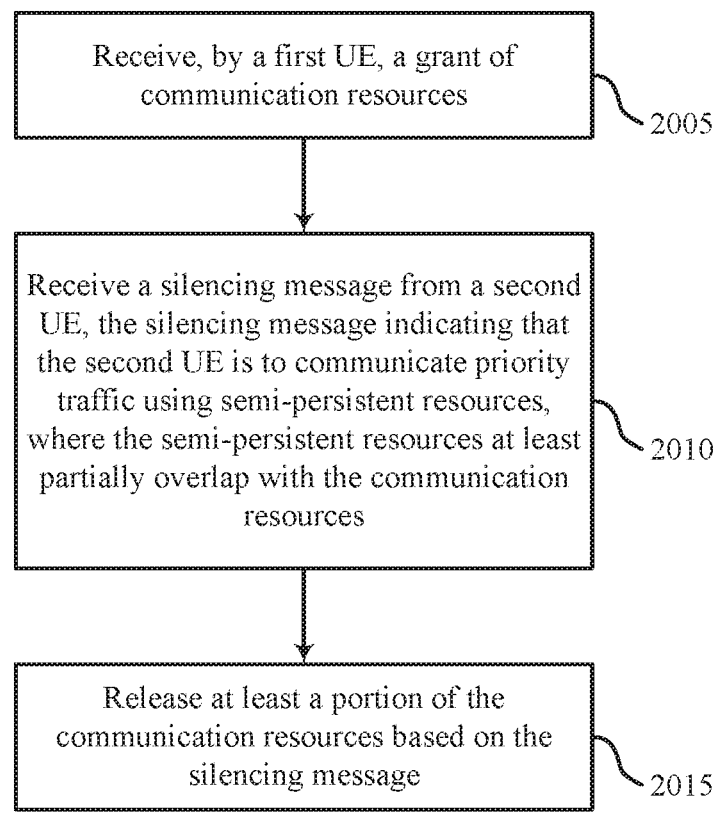
FIGS. 20 through 25 illustrate methods for traffic-priority-based silencing techniques for interference mitigation in accordance with aspects of the present disclosure.

FIG. 20 shows a flowchart illustrating a method 2000 for traffic-priority-based silencing techniques for interference mitigation in accordance with various aspects of the present disclosure. The operations of method 2000 may be implemented by a receiving UE 115-c or its components as described herein. For example, the operations of method 2000 may be performed by a receiving UE communications manager as described with reference to FIGS. 8 through 11. In some examples, a receiving UE 115-c may execute a set of codes to control the functional elements of the device to perform the functions described below. Additionally or alternatively, the receiving UE 115-c may perform aspects of the functions described below using special-purpose hardware.

At block 2005 the receiving UE 115-c may receive, by a first UE, a grant of communication resources. The operations of block 2005 may be performed according to the methods described with reference to FIGS. 1 through 7. In certain examples, aspects of the operations of block 2005 may be performed by a resource manager as described with reference to FIGS. 8 through 11.

At block 2010 the receiving UE 115-c may receive a silencing message from a second UE, the silencing message indicating that the second UE is to communicate priority traffic using semi-persistent resources, wherein the semi-persistent resources at least partially overlap with the communication resources. The operations of block 2010 may be performed according to the methods described with reference to FIGS. 1 through 7. In certain examples, aspects of the operations of block 2010 may be performed by a silencing manager as described with reference to FIGS. 8 through 11.

At block 2015 the receiving UE 115-c may release at least a portion of the communication resources based at least in part on the silencing message. The operations of block 2015 may be performed according to the methods described with reference to FIGS. 1 through 7. In certain examples, aspects of the operations of block 2015 may be performed by a silencing manager as described with reference to FIGS. 8 through 11.

Figure 21:
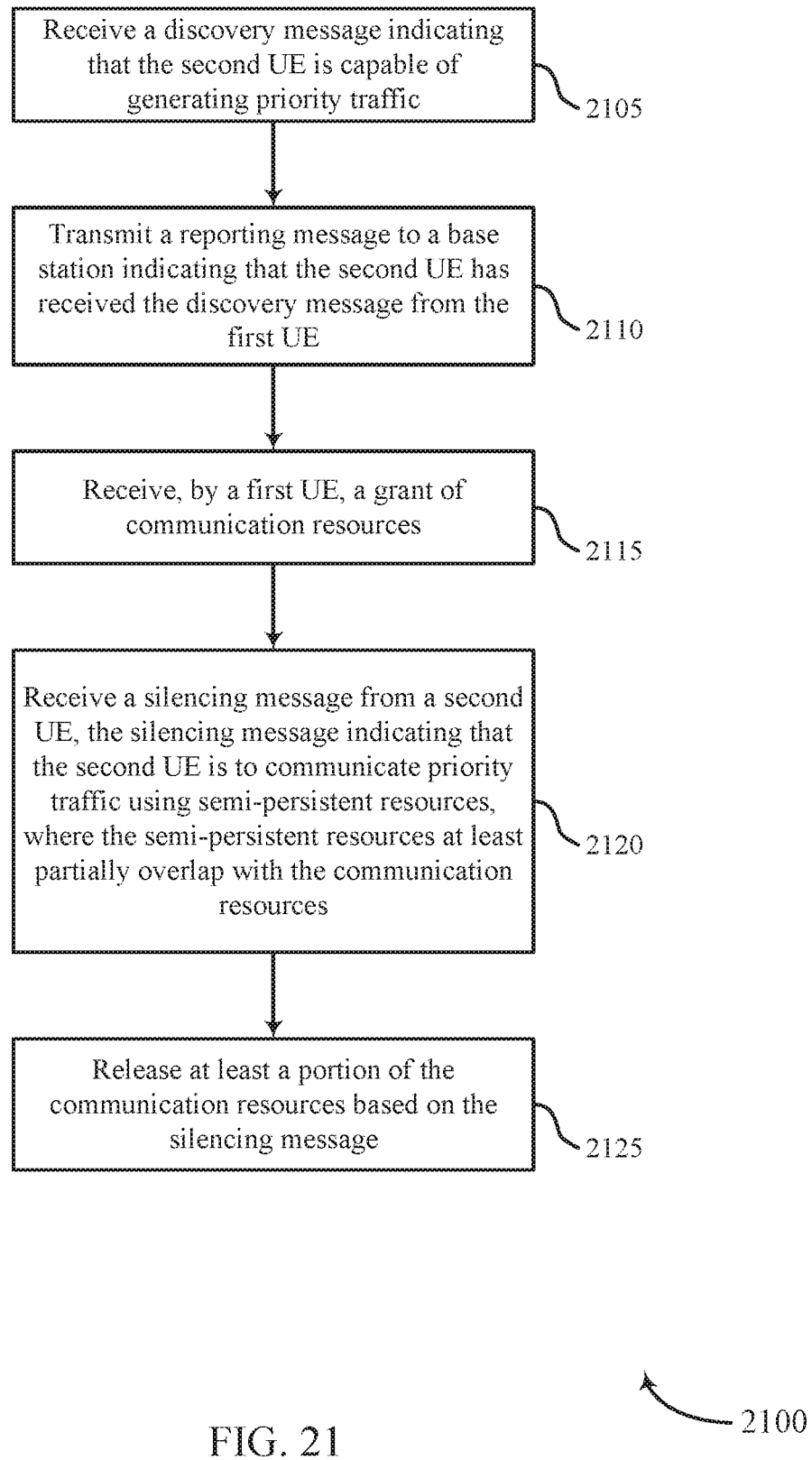

FIG. 21 shows a flowchart illustrating a method 2100 for traffic-priority-based silencing techniques for interference mitigation in accordance with various aspects of the present disclosure. The operations of method 2100 may be implemented by a receiving UE 115-c or its components as described herein. For example, the operations of method 2100 may be performed by a receiving UE communications manager as described with reference to FIGS. 8 through 11. In some examples, a receiving UE 115-c may execute a set of codes to control the functional elements of the device to perform the functions described below. Additionally or alternatively, the receiving UE 115-c may perform aspects of the functions described below using special-purpose hardware.

At block 2105 the receiving UE 115-c may receive a discovery message indicating that the second UE is capable of generating priority traffic. The operations of block 2105 may be performed according to the methods described with reference to FIGS. 1 through 7. In certain examples, aspects of the operations of block 2105 may be performed by a discovery manager as described with reference to FIGS. 8 through 11.

At block 2110 the receiving UE 115-c may transmit a reporting message to a base station indicating that the second UE has received the discovery message from the first UE. The operations of block 2110 may be performed according to the methods described with reference to FIGS. 1 through 7. In certain examples, aspects of the operations of block 2110 may be performed by a reporting manager as described with reference to FIGS. 8 through 11.

At block 2115 the receiving UE 115-c may receive, by a first UE, a grant of communication resources. The operations of block 2115 may be performed according to the methods described with reference to FIGS. 1 through 7. In certain examples, aspects of the operations of block 2115 may be performed by a resource manager as described with reference to FIGS. 8 through 11.

At block 2120 the receiving UE 115-c may receive a silencing message from a second UE, the silencing message indicating that the second UE is to communicate priority traffic using semi-persistent resources, wherein the semi-persistent resources at least partially overlap with the communication resources. The operations of block 2120 may be performed according to the methods described with reference to FIGS. 1 through 7. In certain examples, aspects of the operations of block 2120 may be performed by a silencing manager as described with reference to FIGS. 8 through 11.

At block 2125 the receiving UE 115-c may release at least a portion of the communication resources based at least in part on the silencing message. The operations of block 2125 may be performed according to the methods described with reference to FIGS. 1 through 7. In certain examples, aspects of the operations of block 2125 may be performed by a silencing manager as described with reference to FIGS. 8 through 11.

Figure 22:
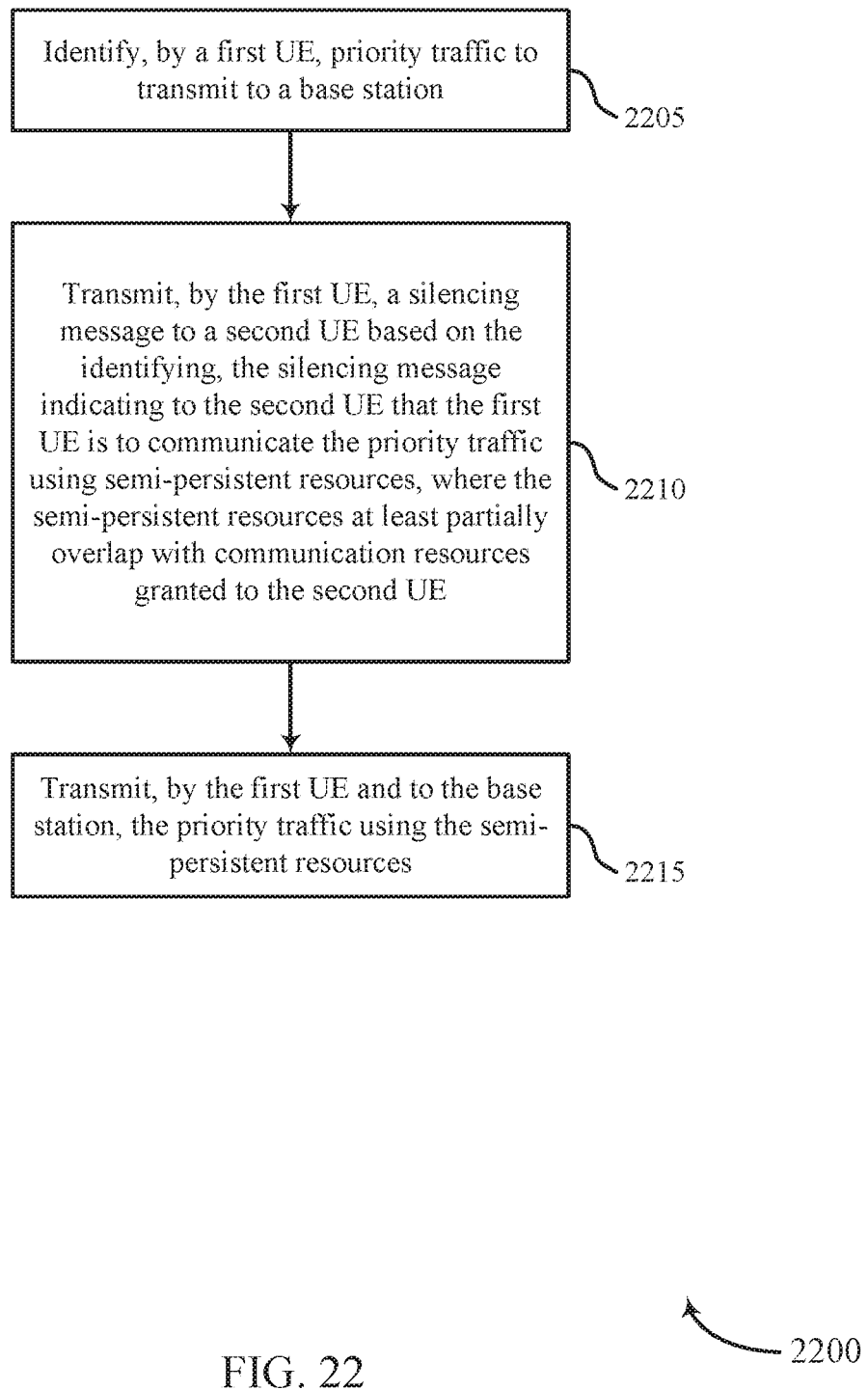

FIG. 22 shows a flowchart illustrating a method 2200 for traffic-priority-based silencing techniques for interference mitigation in accordance with various aspects of the present disclosure. The operations of method 2200 may be implemented by a transmitting UE 115-a or its components as described herein. For example, the operations of method 2200 may be performed by a transmitting UE communications manager as described with reference to FIGS. 12 through 15. In some examples, a transmitting UE 115-a may execute a set of codes to control the functional elements of the device to perform the functions described below. Additionally or alternatively, the transmitting UE 115-a may perform aspects of the functions described below using special-purpose hardware.

At block 2205 the transmitting UE 115-a may identify, by a first UE, priority traffic to transmit to a base station. The operations of block 2205 may be performed according to the methods described with reference to FIGS. 1 through 7. In certain examples, aspects of the operations of block 2205 may be performed by a priority traffic manager as described with reference to FIGS. 12 through 15.

At block 2210 the transmitting UE 115-a may transmit, by the first UE, a silencing message to a second UE based at least in part on the identifying, the silencing message indicating to the second UE that the first UE is to communicate the priority traffic using semi-persistent resources, wherein the semi-persistent resources at least partially overlap with communication resources granted to the second UE. The operations of block 2210 may be performed according to the methods described with reference to FIGS. 1 through 7. In certain examples, aspects of the operations of block 2210 may be performed by a silencing manager as described with reference to FIGS. 12 through 15.

At block 2215 the transmitting UE 115-a may transmit, by the first UE and to the base station, the priority traffic using the semi-persistent resources. The operations of block 2215 may be performed according to the methods described with reference to FIGS. 1 through 7. In certain examples, aspects of the operations of block 2215 may be performed by a priority traffic manager as described with reference to FIGS. 12 through 15.

Figure 23:
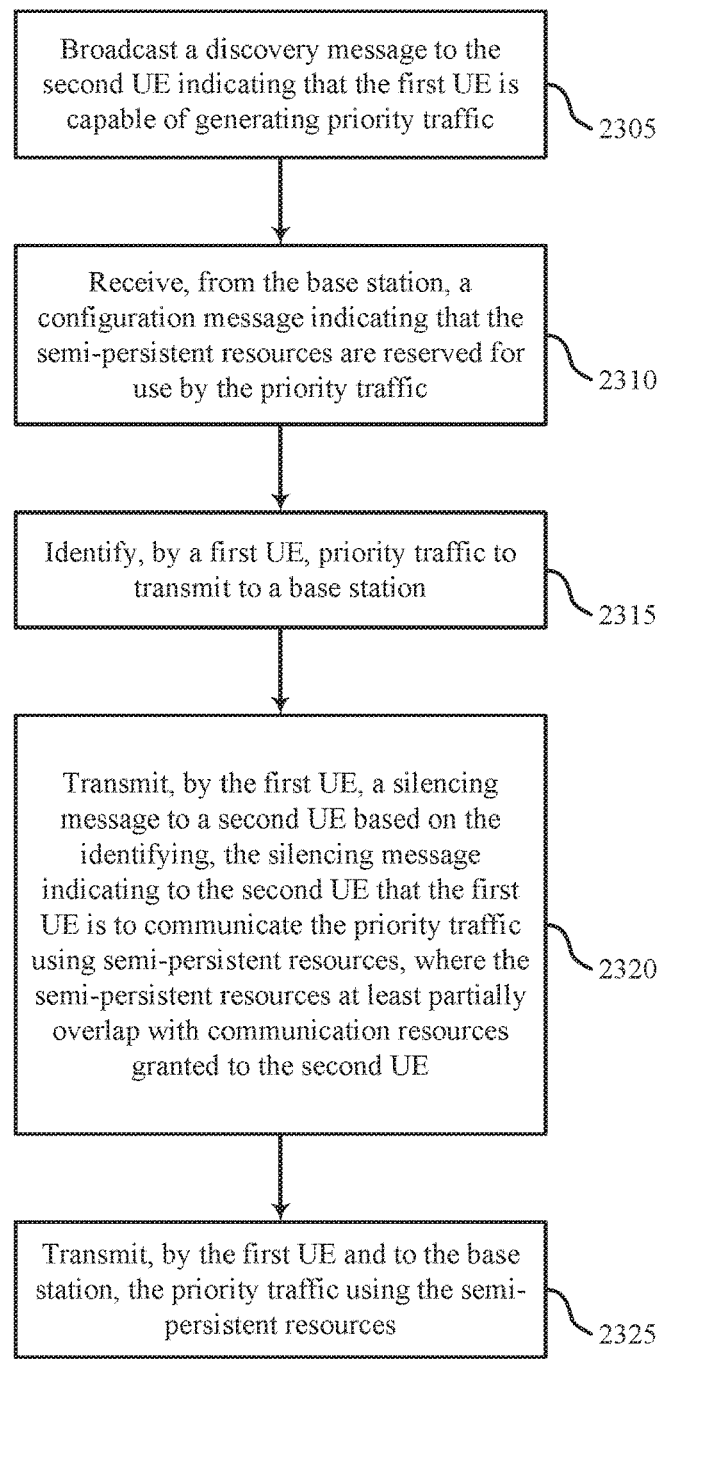

FIG. 23 shows a flowchart illustrating a method 2300 for traffic-priority-based silencing techniques for interference mitigation in accordance with various aspects of the present disclosure. The operations of method 2300 may be implemented by a transmitting UE 115-a or its components as described herein. For example, the operations of method 2300 may be performed by a transmitting UE communications manager as described with reference to FIGS. 12 through 15. In some examples, a transmitting UE 115-a may execute a set of codes to control the functional elements of the device to perform the functions described below. Additionally or alternatively, the transmitting UE 115-a may perform aspects of the functions described below using special-purpose hardware.

At block 2305 the transmitting UE 115-a may broadcast a discovery message to the second UE indicating that the first UE is capable of generating priority traffic. The operations of block 2305 may be performed according to the methods described with reference to FIGS. 1 through 7. In certain examples, aspects of the operations of block 2305 may be performed by a discovery manager as described with reference to FIGS. 12 through 15.

At block 2310 the transmitting UE 115-a may receive, from the base station, a configuration message indicating that the semi-persistent resources are reserved for use by the priority traffic. The operations of block 2310 may be performed according to the methods described with reference to FIGS. 1 through 7. In certain examples, aspects of the operations of block 2310 may be performed by a configuration manager as described with reference to FIGS. 12 through 15.

At block 2315 the transmitting UE 115-a may identify, by a first UE, priority traffic to transmit to a base station. The operations of block 2315 may be performed according to the methods described with reference to FIGS. 1 through 7. In certain examples, aspects of the operations of block 2315 may be performed by a priority traffic manager as described with reference to FIGS. 12 through 15.

At block 2320 the transmitting UE 115-a may transmit, by the first UE, a silencing message to a second UE based at least in part on the identifying, the silencing message indicating to the second UE that the first UE is to communicate the priority traffic using semi-persistent resources, wherein the semi-persistent resources at least partially overlap with communication resources granted to the second UE. The operations of block 2320 may be performed according to the methods described with reference to FIGS. 1 through 7. In certain examples, aspects of the operations of block 2320 may be performed by a silencing manager as described with reference to FIGS. 12 through 15.

At block 2325 the transmitting UE 115-a may transmit, by the first UE and to the base station, the priority traffic using the semi-persistent resources. The operations of block 2325 may be performed according to the methods described with reference to FIGS. 1 through 7. In certain examples, aspects of the operations of block 2325 may be performed by a priority traffic manager as described with reference to FIGS. 12 through 15.

Figure 24:
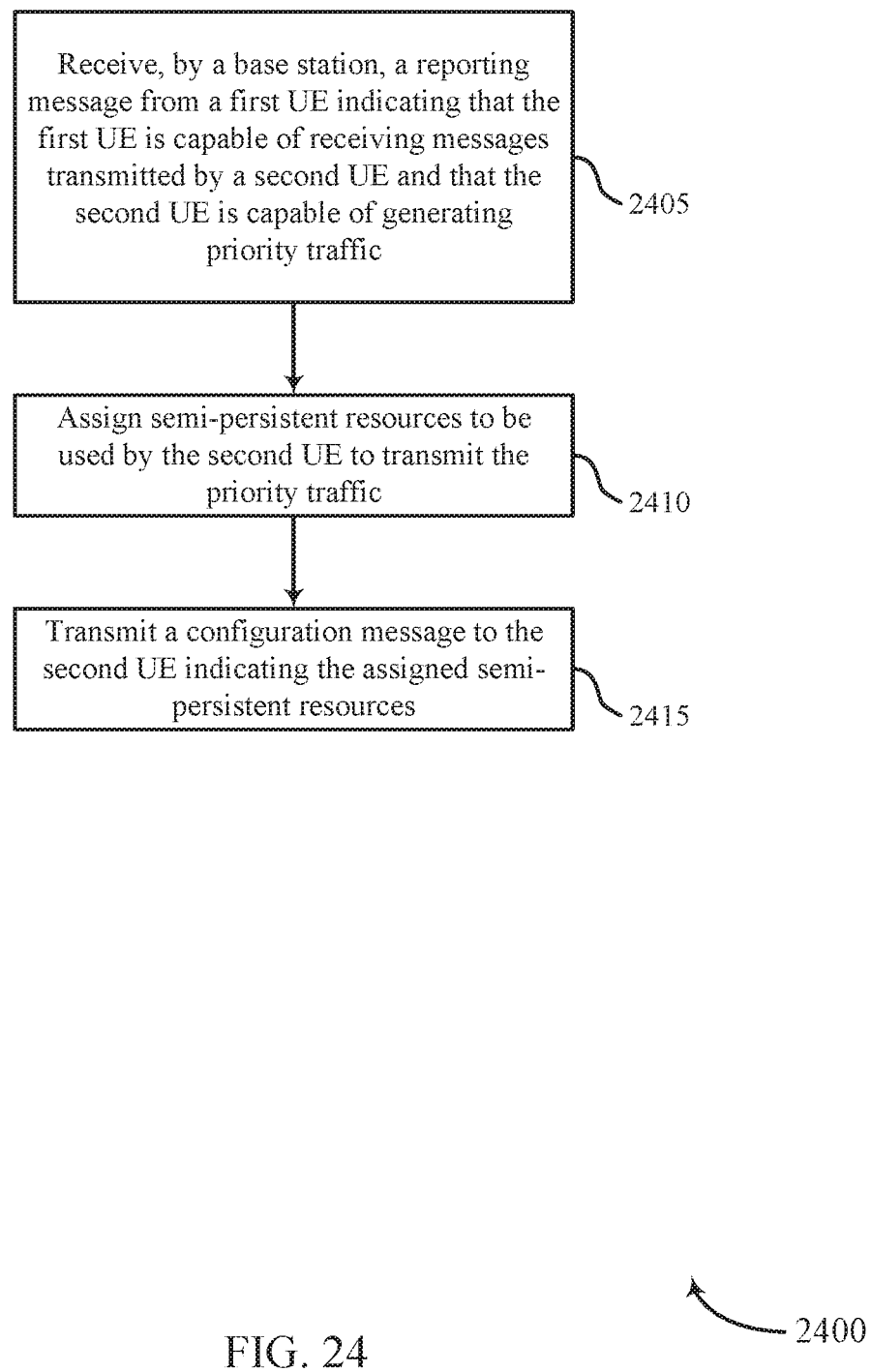

FIG. 24 shows a flowchart illustrating a method 2400 for traffic-priority-based silencing techniques for interference mitigation in accordance with various aspects of the present disclosure. The operations of method 2400 may be implemented by a base station 105 or its components as described herein. For example, the operations of method 2400 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2405 the base station 105 may receive, by a base station, a reporting message from a first UE indicating that the first UE is capable of receiving messages transmitted by a second UE and that the second UE is capable of generating priority traffic. The operations of block 2405 may be performed according to the methods described with reference to FIGS. 1 through 7. In certain examples, aspects of the operations of block 2405 may be performed by a reporting manager as described with reference to FIGS. 16 through 19.

At block 2410 the base station 105 may assign semi-persistent resources to be used by the second UE to transmit the priority traffic. The operations of block 2410 may be performed according to the methods described with reference to FIGS. 1 through 7. In certain examples, aspects of the operations of block 2410 may be performed by a resource manager as described with reference to FIGS. 16 through 19.

At block 2415 the base station 105 may transmit a configuration message to the second UE indicating the assigned semi-persistent resources. The operations of block 2415 may be performed according to the methods described with reference to FIGS. 1 through 7. In certain examples, aspects of the operations of block 2415 may be performed by a configuration manager as described with reference to FIGS. 16 through 19.

Figure 25:
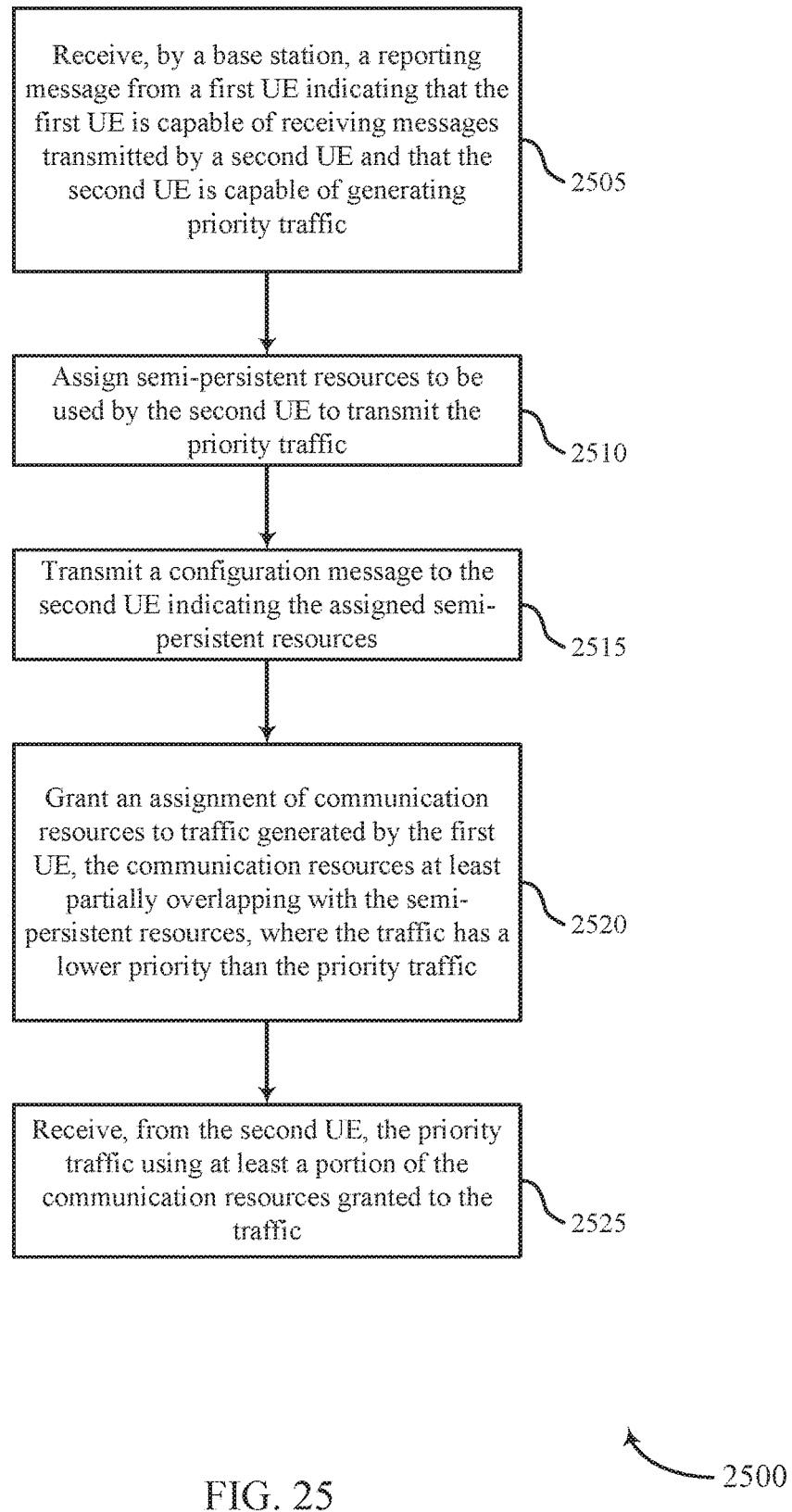

FIG. 25 shows a flowchart illustrating a method 2500 for traffic-priority-based silencing techniques for interference mitigation in accordance with various aspects of the present disclosure. The operations of method 2500 may be implemented by a base station 105 or its components as described herein. For example, the operations of method 2500 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2505 the base station 105 may receive, by a base station, a reporting message from a first UE indicating that the first UE is capable of receiving messages transmitted by a second UE and that the second UE is capable of generating priority traffic. The operations of block 2505 may be performed according to the methods described with reference to FIGS. 1 through 7. In certain examples, aspects of the operations of block 2505 may be performed by a reporting manager as described with reference to FIGS. 16 through 19.

At block 2510 the base station 105 may assign semi-persistent resources to be used by the second UE to transmit the priority traffic. The operations of block 2510 may be performed according to the methods described with reference to FIGS. 1 through 7. In certain examples, aspects of the operations of block 2510 may be performed by a resource manager as described with reference to FIGS. 16 through 19.

At block 2515 the base station 105 may transmit a configuration message to the second UE indicating the assigned semi-persistent resources. The operations of block 2515 may be performed according to the methods described with reference to FIGS. 1 through 7. In certain examples, aspects of the operations of block 2515 may be performed by a configuration manager as described with reference to FIGS. 16 through 19.

At block 2520 the base station 105 may grant an assignment of communication resources to traffic generated by the first UE, the communication resources at least partially overlapping with the semi-persistent resources, wherein the traffic has a lower priority than the priority traffic. The operations of block 2520 may be performed according to the methods described with reference to FIGS. 1 through 7. In certain examples, aspects of the operations of block 2520 may be performed by a resource manager as described with reference to FIGS. 16 through 19.

At block 2525 the base station 105 may receive, from the second UE, the priority traffic using at least a portion of the communication resources granted to the traffic. The operations of block 2525 may be performed according to the methods described with reference to FIGS. 1 through 7. In certain examples, aspects of the operations of block 2525 may be performed by a priority traffic manager as described with reference to FIGS. 16 through 19.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, by a first user equipment (UE), a grant of communication resources;
   receiving a silencing message from a second UE, the silencing message indicating that the second UE is to communicate priority traffic using semi-persistent resources, wherein the semi-persistent resources at least partially overlap with the communication resources;
   determining a next occurrence of the semi-persistent resources after receiving the silencing message; and
   releasing at least a portion of the communication resources that at least partially overlap with the next occurrence of the semi-persistent resources based at least in part on the silencing message.

2. The method of claim 1, wherein:
   the silencing message is received during the same transmission time interval that the portion of the communication resources are released.

3. The method of claim 1, further comprising:
   receiving a discovery message indicating that the second UE is capable of generating priority traffic; and
   transmitting a reporting message to a base station indicating that the second UE has received the discovery message from the first UE.

4. The method of claim 3, wherein:
   the discovery message is a device-to-device communication received directly from the second UE.

5. The method of claim 1, further comprising:
   receiving, from a base station, a configuration message indicating a zone assigned to the first UE and that the semi-persistent resources are associated with the zone.

6. The method of claim 5, wherein:
   the zone is based at least in part on the second UE being capable of generating priority traffic.

7. The method of claim 1, further comprising:
   comparing the communication resources allocated to the first UE by the grant to the semi-persistent resources associated with the second UE, wherein releasing the communication resources is based at least in part on the comparing.

8. The method of claim 1, further comprising:
   determining that the communication resources are being used to communicate traffic having a lesser priority than the priority traffic, wherein releasing the communication resources is based at least in part on the determining.

9. The method of claim 1, further comprising:
   refraining, by the first UE, from transmitting traffic during the communication resources based at least in part on releasing the communication resources.

10. The method of claim 9, further comprising:
    receiving, by the first UE, a second grant that includes new communication resources rescheduling the traffic for transmission, wherein the new communication resources are different from the communication resources.

11. The method of claim 1, wherein:
    the second UE is capable of generating priority traffic.

12. The method of claim 1, wherein:
    the priority traffic is low latency traffic.

13. An apparatus for wireless communication, in a system comprising:
    a processor;
    memory in electronic communication with the processor; and
    instructions stored in the memory and operable, when executed by the processor, to cause the apparatus to:
    receive, by a first user equipment (UE), a grant of communication resources;
    receive a silencing message from a second UE, the silencing message indicating that the second UE is to communicate priority traffic using semi-persistent resources, wherein the semi-persistent resources at least partially overlap with the communication resources;

determine a next occurrence of the semi-persistent resources after receiving the silencing message; and release at least a portion of the communication resources that at least partially overlap with the next occurrence of the semi-persistent resources based at least in part on the silencing message.

14. The apparatus of claim 13, wherein:
the silencing message is received during the same transmission time interval that the portion of the communication resources are released.

15. The apparatus of claim 13, wherein the instructions are further executable by the processor to:
receive a discovery message indicating that the second UE is capable of generating priority traffic; and
transmit a reporting message to a base station indicating that the second UE has received the discovery message from the first UE.

16. The apparatus of claim 15, wherein:
the discovery message is a device-to-device communication received directly from the second UE.

17. The apparatus of claim 13, wherein the instructions are further executable by the processor to:
receive, from a base station, a configuration message indicating a zone assigned to the first UE and that the semi-persistent resources are associated with the zone.

18. The apparatus of claim 17, wherein:
the zone is based at least in part on the second UE being capable of generating priority traffic.

19. The apparatus of claim 13, wherein the instructions are further executable by the processor to:
compare the communication resources allocated to the first UE by the grant to the semi-persistent resources associated with the second UE, wherein releasing the communication resources is based at least in part on the comparing.

20. The apparatus of claim 13, wherein the instructions are further executable by the processor to:
determine that the communication resources are being used to communicate traffic having a lesser priority than the priority traffic, wherein releasing the communication resources is based at least in part on the determining.

21. The apparatus of claim 13, wherein the instructions are further executable by the processor to:
refrain, by the first UE, from transmitting traffic during the communication resources based at least in part on releasing the communication resources.

22. The apparatus of claim 21, wherein the instructions are further executable by the processor to:
receive, by the first UE, a second grant that includes new communication resources rescheduling the traffic for transmission, wherein the new communication resources are different from the communication resources.

23. The apparatus of claim 13, wherein:
the second UE is capable of generating priority traffic.

24. The apparatus of claim 13, wherein:
the priority traffic is low latency traffic.

* * * * *